United States Patent
Fu et al.

(10) Patent No.: US 10,129,495 B2
(45) Date of Patent: Nov. 13, 2018

(54) APPARATUS AND METHOD FOR GENERATING LOCAL BINARY PATTERNS (LBPS)

(71) Applicant: QUALCOMM Incorporated, San Diego, CA (US)

(72) Inventors: Zhengming Fu, Austin, TX (US); Shan Lu, San Diego, CA (US); Jing Ling, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/081,642

(22) Filed: Mar. 25, 2016

(65) Prior Publication Data

US 2017/0280079 A1    Sep. 28, 2017

(51) Int. Cl.
*H04N 5/374*    (2011.01)
*G06K 9/46*    (2006.01)
(Continued)

(52) U.S. Cl.
CPC .......... *H04N 5/374* (2013.01); *G06F 1/3234* (2013.01); *G06K 9/4604* (2013.01); *H04N 5/378* (2013.01)

(58) Field of Classification Search
CPC ...... H04N 5/374; H04N 5/378; G06F 1/3234; G06K 9/4604
See application file for complete search history.

(56) References Cited

U.S. PATENT DOCUMENTS 6,466,961 B1 * 10/2002 Miller ................. G01J 3/26
                                                                708/816

6,606,122 B1    8/2003 Shaw et al.
(Continued)

FOREIGN PATENT DOCUMENTS

DE    102008052930 A1    4/2010

OTHER PUBLICATIONS

Suarez M., et al., "CMOS-3D Smart Imager Architectures for Feature Detection", IEEE Journal on Emerging and Selected Topics in Circuits and Systems, IEEE, Piscataway, NJ, USA, vol. 2, No. 4, Dec. 1, 2012 (Dec. 1, 2012), pp. 723-736, XP011479510, ISSN: 2156-3357, DOI: 10.1109/JETCAS.2012.2223552.
(Continued)

*Primary Examiner* — Twyler Haskins
*Assistant Examiner* — Carramah J Quiett
(74) *Attorney, Agent, or Firm* — Kilpatrick Townsend & Stock/Qualcomm

(57) ABSTRACT

Techniques for direct local binary pattern (LBP) generation are presented. An image sensor for LBP generation includes a variable reference signal generator and a sensor pixel array that can generate events based on optical signals on the sensor pixel array and a reference level from the variable reference signal generator. The image sensor also includes an address encoder that can encode the addresses of the sensor pixels that generate events, and a binary image generator that can create a binary image based on the addresses of the sensor pixels that generate the events at the reference level. The image sensor may also include a local binary pattern generator configured to determine local binary pattern labels for image pixels whose binary value changes from a first binary image at a first reference level to a subsequent second binary image at a next reference level.

30 Claims, 15 Drawing Sheets

(51) Int. Cl.
*G06F 1/32* (2006.01)
*H04N 5/378* (2011.01)

(56) References Cited

U.S. PATENT DOCUMENTS

| | | | |
|---|---|---|---|
| 7,512,861 | B2 | 3/2009 | Brajovic |
| 8,780,240 | B2 | 7/2014 | Posch et al. |
| 9,380,245 | B1 * | 6/2016 | Guidash ............ H04N 5/378 |
| 2014/0125994 | A1 | 5/2014 | Kim et al. |
| 2017/0064211 | A1 | 3/2017 | Omid-Zohoor |

OTHER PUBLICATIONS

Kim, D. et al., "Tri-Mode Smart Vision Sensor with 11-Transistors/Pixel for Wireless Sensor Networks," IEEE Sensors Journal, Jun. 2013, vol. 13 (6), pp. 2102-2108.

Lopich, A. et al., "A SIMD Cellular Processor Array Vision Chip with Asynchronous Processing Capabilities," IEEE Transactions on Circuits and Systems—I: Regular Papers, Oct. 2011, vol. 58 (10), pp. 2420-2431.

Culurciello, E. et al., "A Biomorphic Digital Image Sensor," IEEE Journal of Solid-State Circuits, vol. 38, No. 2, pp. 281-294, Feb. 2003.

Gunjal V., "Development of Feature Descriptors for Event-based Vision Sensors", Dec. 18, 2012, XP055195885, Retrieved from the Internet: URL:https://www.ini.uzh.ch/~tobi/wiki/lib/exe/fetch.php?media=gunjalbachelorsthesis2012.pdf [retrieved on Jun. 15, 2015], 80 pages.

International Search Report and Written Opinion—PCT/US2017/018745—ISA/EPO—dated May 15, 2017.

Lichtsteiner P., et al., "A 128×128 120 dB 15 us Latency Asynchronous Temporal Contrast Vision Sensor", IEEE Journal of Solid-State Circuits, IEEE Service Center, Piscataway, NJ, USA, vol. 43, No. 2, Feb. 1, 2008 (Feb. 1, 2008), pp. 566-576, XP011200748, ISSN: 0018-9200, DOI: 10.1109/JSSC.2007.914337.

Meng J., et al., "Face Recognition Based on Local Binary Patterns with Threshold", IEEE International Conference on Granular Computing, Aug. 14, 2010, XP031756010, ISBN: 978-1-4244-7964-1, pp. 352-356.

Posch C., et al., "A QVGA 143 dB Dynamic Range Frame-Free PWM Image Sensor With Lossless Pixel-Level Video Compression and Time-Domain CDS", IEEE Journal of Solid-State Circuits, vol. 46. No. 1, Jan. 1, 2011, XP055185382, ISSN: 0018-9200, DOI: 10.1109/JSSC.2010.2085952, pp. 259-275.

* cited by examiner

| 80 | 30 | 70 |
| --- | --- | --- |
| 20 | 40 | 20 |
| 50 | 10 | 60 |

FIG. 4A

| 40 | -10 | 30 |
| --- | --- | --- |
| -20 | | -20 |
| 10 | -30 | 20 |

FIG. 4B

| 1 | 0 | 1 |
| --- | --- | --- |
| 1 | | 0 |
| 1 | 0 | 1 |

FIG. 4C

| 1 | 0 | 1 | 0 | 1 | 0 | 1 | 0 |
| --- | --- | --- | --- | --- | --- | --- | --- |

$LBP = 8b'10101010 = 1*2^7 + 0*2^6 + 1*2^5 + 0*2^4 + 1*2^3 + 0*2^2 + 1*2^1 + 0*2^0 = 170$

FIG. 4D

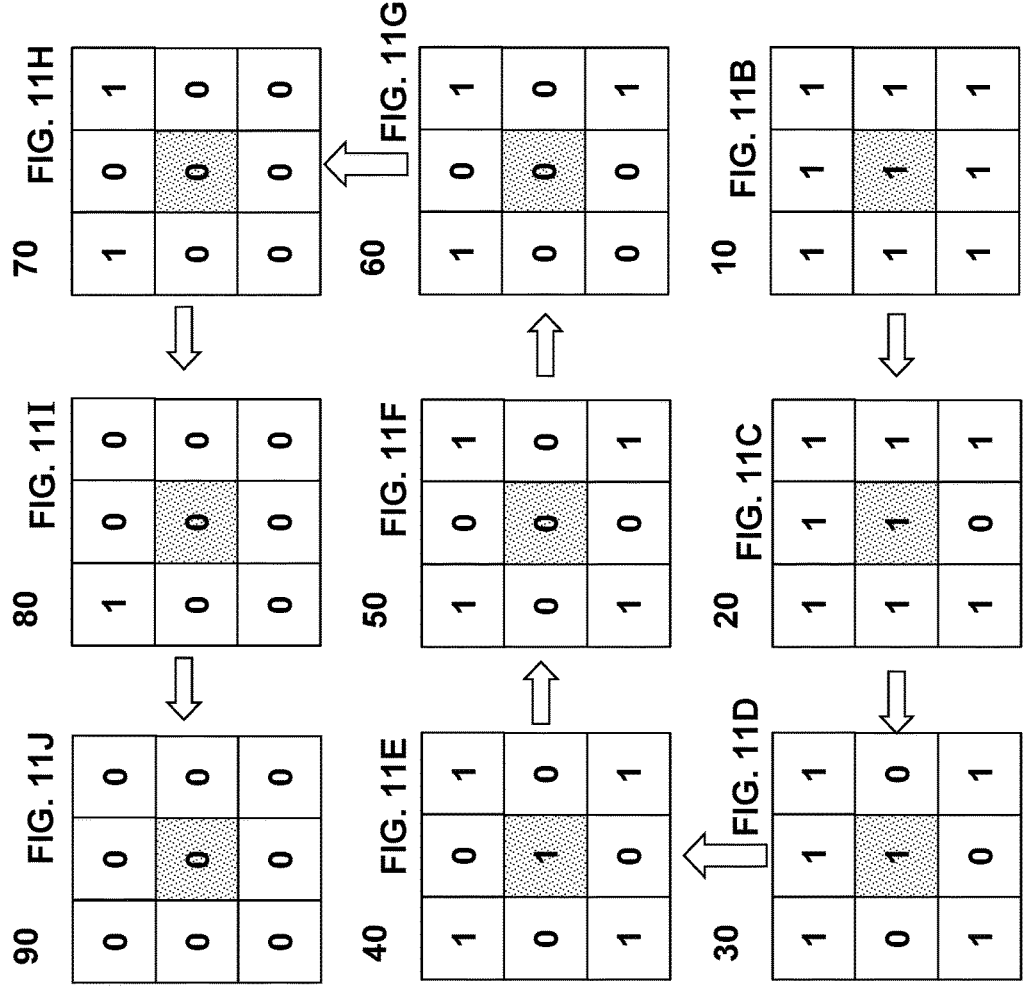

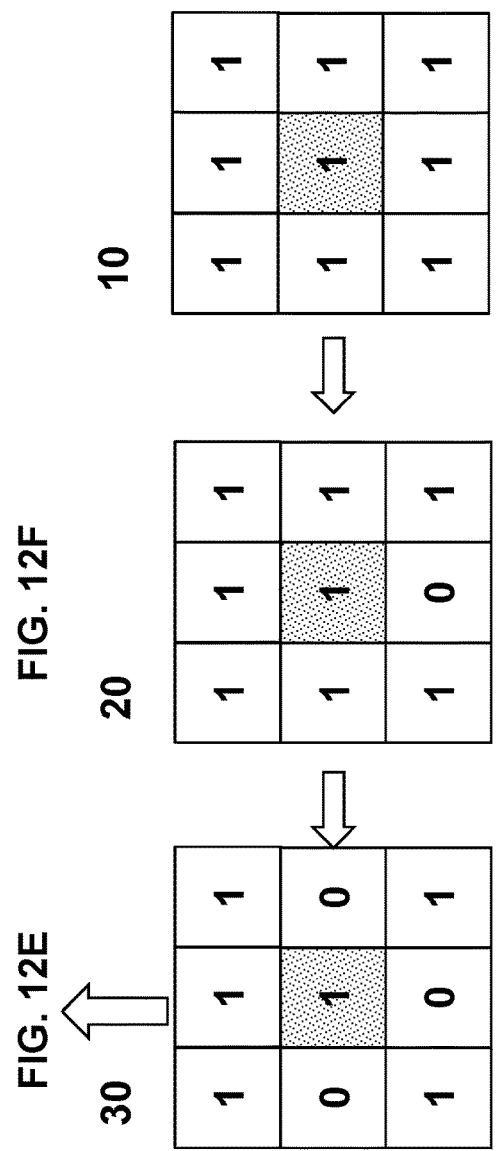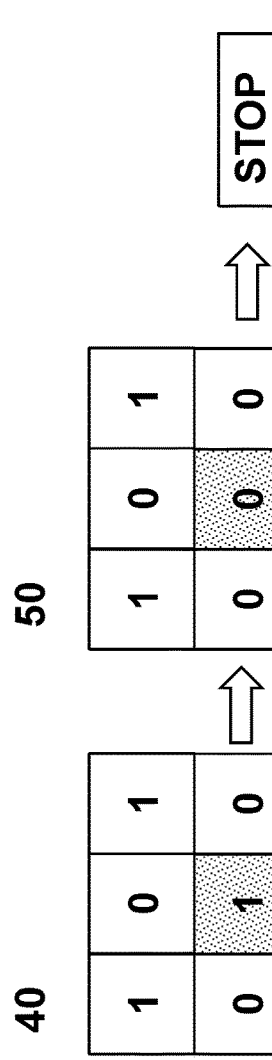

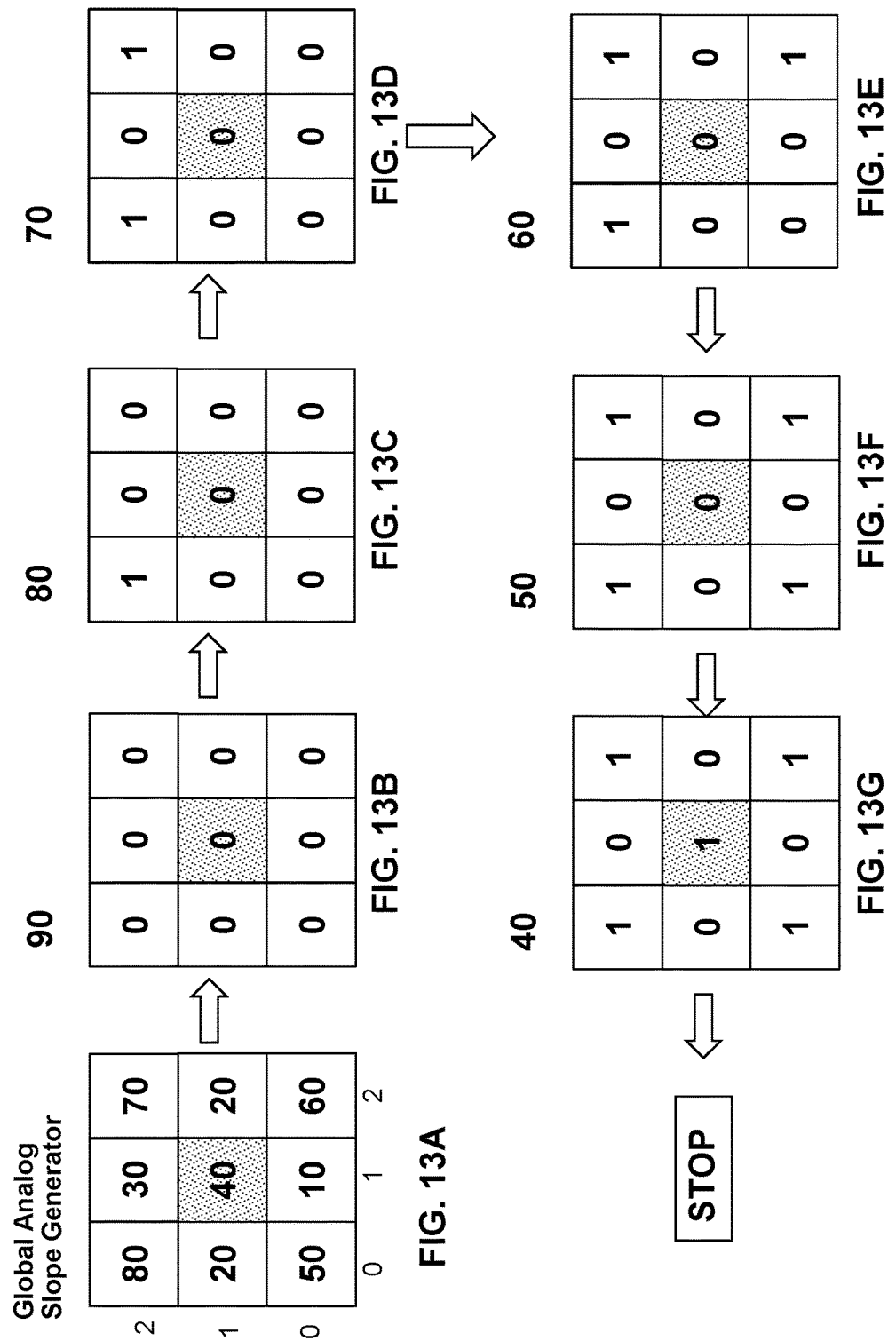

APPARATUS AND METHOD FOR GENERATING LOCAL BINARY PATTERNS (LBPS)

BACKGROUND

Computer vision involves acquiring, processing, analyzing, and understanding images for use in applications. Traditionally, a processor, for example, an image sensor processor (ISP), coupled to a sensor acquires image data from the sensor and performs certain computer vision operations on the acquired image data to detect features. Programs executing on the processor may utilize the detected features in a variety of applications, such as plane detection, object classification, face detection, smile detection, and gesture detection.

Much effort has been made in recent years to enable computing devices to detect or classify features and objects in the field of view of a computing device, such as a mobile device. Capturing images in the field of view of the computing device using traditional image sensors and processing the images to extract features using conventional processors require significant processing resources, resulting in high power consumption and short battery life per charge cycle in computing devices, such as mobile devices, which are generally very sensitive to energy consumption.

BRIEF SUMMARY

This disclosure generally relates to feature extraction using computer vision techniques. More specifically, techniques disclosed herein relate to directly generating local binary patterns (LBP) labels for feature detection using a global variable reference voltage generator, such as a single-slope ramp signal generator, and an address-event representation (AER) based image sensor to sort 2-dimensional pixel data. No analog-to-digital conversion (ADC) circuit is required to convert analog sensor signals to digital image data. The power consumption of an image sensor using the techniques disclosed herein can be much lower than the power consumption exhibited in conventional techniques such as an image sensor with a pixel array and an ADC interface, in conjunction with software-based or register transfer level (RTL)-based LBP generation.

In some embodiments, a method for direct local binary pattern generation is disclosed. The method includes receiving a variable reference signal at a plurality of sensor pixels, where the variable reference signal changes monotonically within a plurality of reference levels. For each reference level of the plurality of reference levels, an optical signal on each sensor pixel of a plurality of sensor pixels is converted into an electrical signal, and an event is generated at each sensor pixel on which a condition based on a comparison between the electrical signal and the reference level is met. The address of each sensor pixel that generates the event can be encoded. A binary image for the reference level can then be generated based on the address of each sensor pixel that generates the event at the reference level. In some embodiments, when a binary value of an image pixel changes from a first binary image for a first reference level to a subsequent second binary image for a next reference level, a local binary pattern label for the image pixel can be determined based on binary values of neighboring image pixels of the image pixel in the first binary image or the subsequent second binary image. In some embodiments, the local binary pattern label for the image pixel may be added to a local binary pattern histogram.

In some embodiments, an image sensor is disclosed. The image sensor includes a sensor pixel array comprising a plurality of sensor pixels, where each sensor pixel in the sensor pixel array includes a sensing element and a comparator, a signal input of the comparator coupled to the sensing element. The image sensor also includes a global reference signal input port coupled to a reference input of the comparator of each sensor pixel, where the global reference signal input port is configured to receive a global reference signal varying monotonically among a plurality of reference levels. The image sensor also includes an address encoder coupled to an output of the comparator of each sensor pixel in the sensor pixel array, the address encoder configured to encode an address of each sensor pixel that generates an event at the output of the comparator. The image sensor further includes a binary image generator configured to create a binary image at each reference level of the plurality of reference levels based on the address of each sensor pixel that generates the event at the each reference level. In some embodiments, the image sensor may include a local binary pattern generator configured to determine local binary pattern labels for image pixels whose binary value changes from a first binary image at a first reference level to a subsequent second binary image at a next reference level.

Also disclosed herein is an apparatus for local binary pattern generation. The apparatus includes means for receiving a variable reference signal at a plurality of sensor pixels, where the variable reference signal changes monotonically within a plurality of reference levels, and means for converting an optical signal on each sensor pixel of the plurality of sensor pixels into an electrical signal. The apparatus also includes means for generating an event at each sensor pixel on which a condition based on a comparison between the electrical signal and a reference level of the plurality of reference levels is met, and means for encoding an address of each sensor pixel that generates the event. The apparatus further includes means for creating a binary image for each reference level of the plurality of reference levels based on the address of each sensor pixel that generates the event at the each reference level.

Also disclosed herein is an article comprising a non-transitory storage medium. The non-transitory storage medium includes machine-readable instructions stored thereon that are executable by a special purpose computing device to receive a variable reference signal at a plurality of sensor pixels, where the variable reference signal changes monotonically within a plurality of reference levels. The machine-readable instructions are also executable by the special purpose computing device to convert an optical signal on each sensor pixel of the plurality of sensor pixels into an electrical signal, and generate an event at each sensor pixel on which a condition based on a comparison between the electrical signal and a reference level of the plurality of reference levels is met, using each sensor pixel of the plurality of sensor pixels. The machine-readable instructions are also executable by the special purpose computing device to encode an address of each sensor pixel that generates the event, and create a binary image based on the address of each sensor pixel that generates the event. In some embodiments, the non-transitory storage medium further includes machine-readable instructions stored thereon that are executable by the special purpose computing device to, when a binary value of an image pixel changes from a first binary image corresponding to a first reference level to a subsequent second binary image corresponding to a next reference level, determine a local binary pattern label for the image pixel based on binary values of neighboring image pixels of the image pixel in the first binary image or the subsequent second binary image.

BRIEF DESCRIPTION OF THE DRAWINGS

Aspects of the disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure may be realized by reference to the remaining portions of the specification and the drawings.

FIGS. 3A-3D illustrate an example process of converting image data into a histogram based on local binary pattern (LBP) labels, wherein FIG. 3A illustrates an area of interest in a captured image, FIG. 3B illustrates a cell of a 3×3 pixel array from the area of interest, FIG. 3C illustrates the LBP label for the cell, and FIG. 3D illustrates a histogram of LBP labels for cells in the area of interest.

FIGS. 4A-4D illustrate an example method of generating a local binary pattern label for a cell in an image, wherein FIG. 4A illustrates a cell with a center pixel and 8 neighbor pixels, FIG. 4B illustrates the differences between the neighbor pixels and the center pixel, FIG. 4C illustrates binary values for the neighbor pixels, and FIG. 4D illustrates the generated LBP label in binary format and decimal format.

FIG. 11A illustrates a 3×3 sensor pixel array with corresponding light intensity on each pixel in gray scale. FIGS. 11B-11J illustrate different binary images for the 3×3 sensor pixel array of FIG. 11A at different reference levels as the reference levels ramp up.

FIG. 12A illustrates a 3×3 sensor pixel array with corresponding light intensity on each pixel in gray scale. FIGS. 12B-12F illustrate different binary images for the 3×3 sensor pixel array of FIG. 12A at different reference levels during LBP label generation, according to an embodiment of this disclosure.

FIG. 13A illustrates a 3×3 sensor pixel array with corresponding light intensity on each pixel in gray scale. FIGS. 13B-13G illustrate different binary images for the 3×3 sensor pixel array of FIG. 13A at different reference levels during LBP label generation, according to another embodiment of this disclosure.

DETAILED DESCRIPTION

Figure 1:
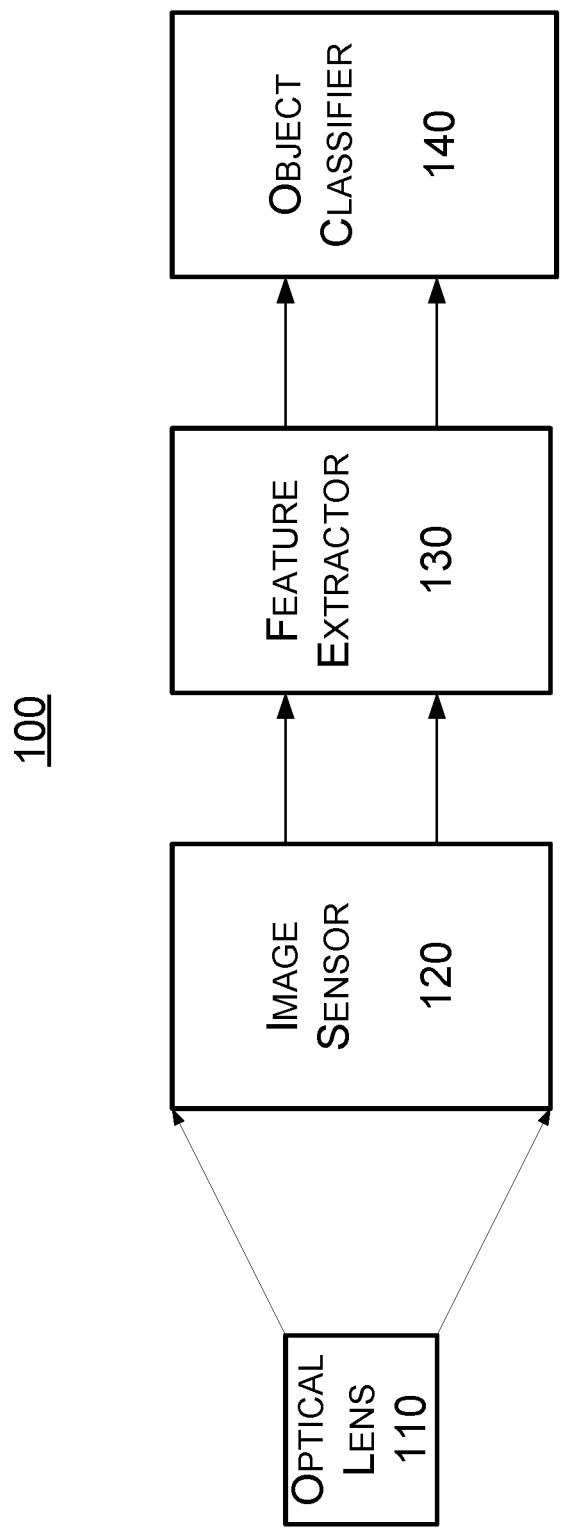
FIG. 1 illustrates an example block diagram of a computer vision-based object detection system.

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

An object detection technique based on feature extraction from local binary patterns (LBPs) generated using a single-slope ramp signal generator and an address-event representation (AER) based image sensor is disclosed. In each pixel of the image sensor, a light intensity sensor, such as a photodiode or phototransistor, converts an optical signal to an electrical signal, and a comparator compares the electrical signal with a variable reference signal generated by the single-slope ramp signal generator. At each reference level of the ramp signal, when a condition based on a comparison between the electrical signal and the reference level is met on a pixel, for example, when the electrical signal is greater than the reference level, an event may be generated at the pixel. A binary image may be generated for each reference level based on the occurrence or nonoccurrence of events, or a frequency of events at each pixel. As the reference level changes, events generated at a pixel may change as well; thus new binary images may be generated or updated. When the binary value of a pixel changes from one binary image to a subsequent binary image as the reference level changes, the local binary pattern label for the pixel may be read out based on binary values of neighbor pixels in the one binary image or the subsequent binary image. In this way, LBP labels for all pixels of interest may be generated as the reference level changes. A histogram of the LBP values for the pixels of interest can be generated for feature extraction and detection as LBP labels for the pixels of interest are generated.

In the techniques disclosed herein, no analog-to-digital conversion (ADC) circuit is required to convert analog sensor signals to digital image data in the image sensor. The power consumption using the techniques disclosed herein can thus be much lower than the conventional techniques such as an image sensor with a pixel array and an ADC interface and software-based or register transfer level (RTL)-based LBP generation.

Methods and systems disclosed herein may be used for detecting an object, such as a person, a building, or other physical object. In some embodiments, the methods and systems disclosed herein can be used for detecting a human face, an expression of a human face, or a gesture of a person. In some other embodiments, the disclosed methods and systems can be used to detect an event, such as a motion.

For example, in an always-on application of a mobile device, a majority of the mobile device may enter a low power mode with only a portion of the mobile device in active mode for detecting a presence or a predefined activity of a user. The portion of the mobile device in active mode may repeatedly capture images in the field of view of the mobile device before a target object, such as a person, an expression of a person, or a gesture of a person, is detected. If the target object is detected in the captured images, the mobile device may enter an active mode, such as waking up more processing units, or performing more complex vision techniques, for example, for better accuracy. Otherwise, the majority of the mobile device remains in the low power mode, and the portion of the mobile device in active mode continues to detect the target object.

I. Object Classification Using LBP

FIG. 1 illustrates an example block diagram of a computer vision-based object detection or classification system 100. As illustrated, system 100 includes an optical lens 110, an image sensor 120, a feature extractor 130, and an object classifier 140. System 100 may be a stand-alone device or may be a part of a mobile device, such as a cellular phone or a tablet. As shown in FIG. 1, optical lens 110 projects an image on image sensor 120, which generates image data of the image. The image data may be temporarily stored in a memory device, such as an SRAM device, for later processing. Feature extractor 130 extracts features of interest from the image data. Object classifier 140 compares the extracted features from the image data with expected features of a target object, and determines the existence or non-existence of the target object in the image.

Optical lens 110, image sensor 120, feature extractor 130, and object classifier 140 may be implemented in various different configurations at various different granularities. For example, image sensor 120 may represent a single sensor element or the entire sensor array. Feature extractor 130 may be implemented as on-chip sensor circuitry, dedicated peripheral circuitry, firmware/software instructions executable on a general-purpose or special-purpose processor, or any combination thereof. Object classifier 140 may be implemented as on-chip sensor circuitry, peripheral circuitry, firmware/software instructions executable on a general-purpose or special-purpose processor, or any combination thereof. Feature extractor 130 and object classifier 140 may be configured to perform digital operations, analog operations or mixed digital and analog operations. Feature extractor 130 and object classifier 140 may be implemented as firmware/software instructions executable on a same general-purpose or special-purpose processor.

Feature extractor 130 may extract features, such as edges, corners, textures, gradients, and complex human features such as faces, smiles and gestures. Examples of feature extraction techniques that may be used by feature extractor 130 include, but are not limited to, local binary pattern operations, histogram of oriented gradients (HOG) operations, various modifications or improvements to LBP and HOG, and any combination thereof.

Object classifier 140 may classify extracted features of the image using techniques, such as supervised machine learning classification techniques, including K-nearest neighbor (KNN), trees, Naïve Bayes, logistic regression and support vector machine (SVM).

Figure 2:
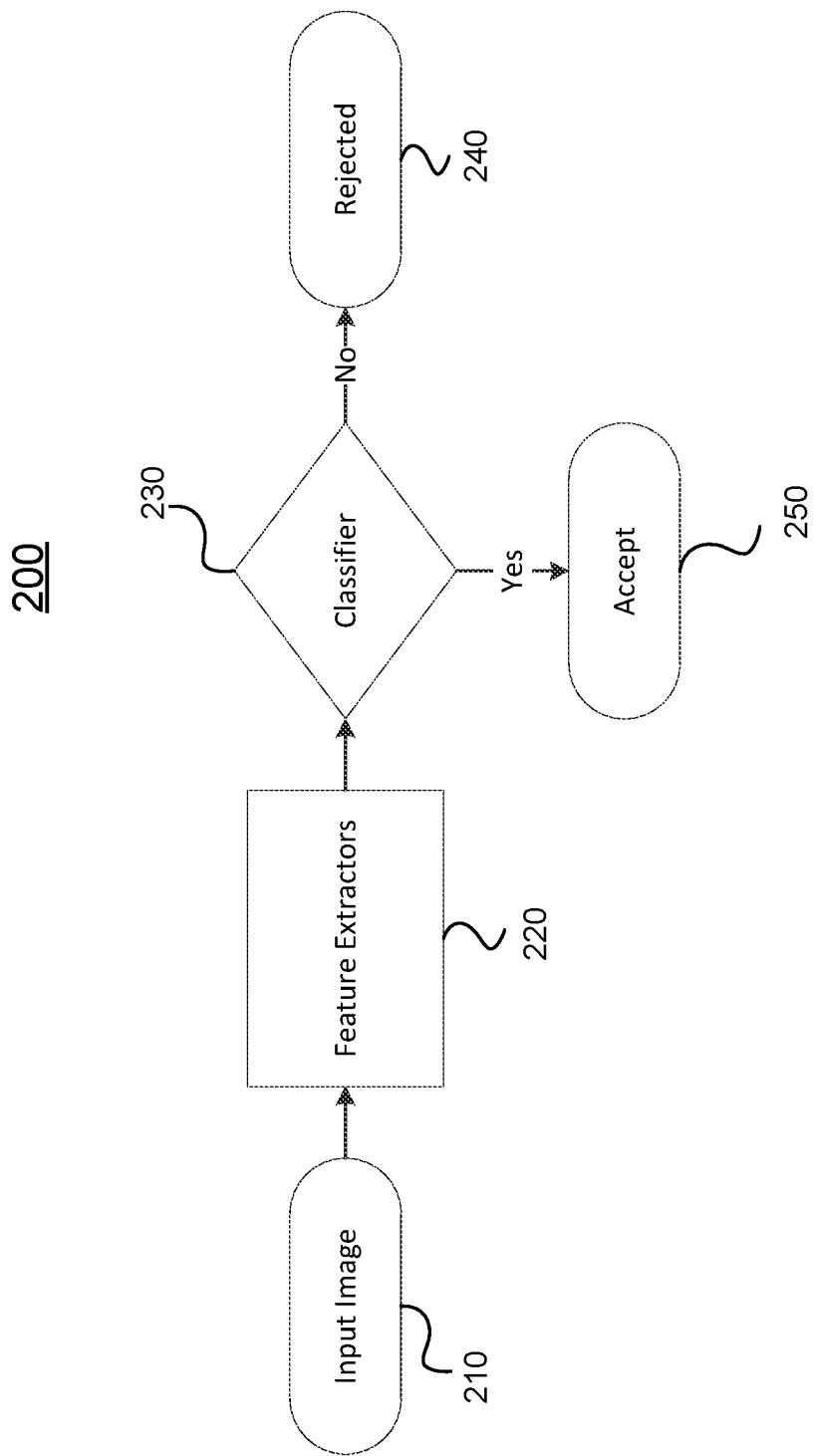
FIG. 2 is a flow chart illustrating a method of object detection or classification using an acquired image.

FIG. 2 is a flow chart illustrating a process 200 for object detection or classification from acquired image(s) using, for example, system 100 of FIG. 1. At block 210, image data used for object detection is acquired by, for example, a camera, or received from, for example, a memory. At block 220, features of the image data are extracted using one or more feature extractors. At block 230, one or more classifiers detect a target object in the image data based on features of the target object and the extracted features of the image data using various classification techniques as described above. At block 240, if certain essential characteristic features of the target object are absent in the extracted features of the image data, the image is rejected as not including the target object. At block 250, if all characteristic features of the target object are present in the extracted features of the image data, the image is classified as containing the target object.

Feature extraction is very important to object detection and classification. It is desirable that extracted features are robust, discriminative, compact and efficient. Various techniques for extracting discriminative and robust image features have been used in pedestrian detection, such as Haar wavelets, region covariance, HOG, and pyramid HOG (PHOG). HOG has been successfully used in pedestrian detection, but it is computationally intensive. Local binary pattern and extended versions of LBP have been used for illumination invariant feature extraction, and outperform many existing feature extraction techniques.

Local feature detection and description have gained a lot of interest since photometric descriptors computed for interested regions have proven to be successful in many applications. The basic idea of local feature detection is to first detect interested regions that are covariant to a class of transformations. Then, for each detected region, invariant descriptors are built. Once the descriptors are computed, interested regions can be matched between images.

Local binary pattern is a powerful gray level invariant texture primitive for texture description. LBP describes each pixel by the relative gray levels of its neighboring pixels, and can be computed as follows:

$$LBP_{R,N}(x, y) = \sum_{i=0}^{N-1} s(n_i - n_c) \times 2^i, \quad (1)$$

$$s(g) = \begin{cases} 0, & g < T \\ 1, & g \geq T \end{cases}, \quad (2)$$

where (x, y) is the location of the pixel in the image, s( ) is a threshold function, $n_c$ corresponds to the gray level of the center pixel of a local neighborhood, and $n_i$ corresponds to the gray level of the ith pixel of N equally spaced pixels on a circle of radius R. The values of neighbors that do not fall on pixels may be estimated using bilinear interpolation. If a difference between the gray level of a neighbor pixel and the gray level of the center pixel is no less than a threshold value T, such as 0, a "1" is assigned to the bit representing the neighbor pixel. Otherwise, a "0" is assigned to the bit representing the neighboring pixel. Thus, LBP of a center pixel is represented by an N-bit binary number, each corresponding to a neighbor pixel. The LBP descriptor has several properties that favor its usage in feature extraction from the interested region. The features described by the LBP operator are robust against illumination changes, are easy and fast to compute, do not require many parameters to be set, and have high discriminative power.

Figure 3A:
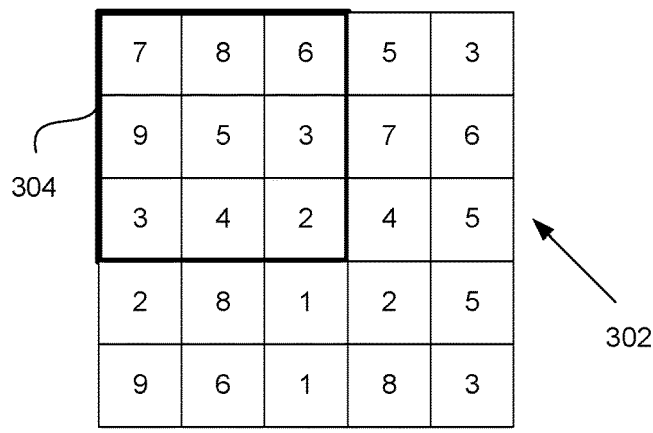
Figure 3B:
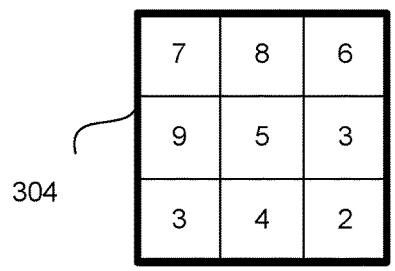
Figure 3C:
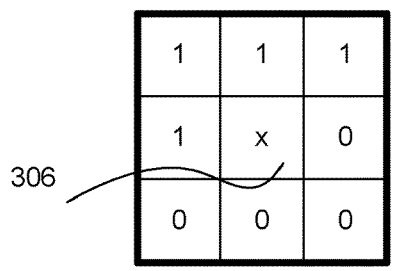

FIGS. 3A-3D illustrate an example process of converting image data into a histogram for classification using LBP labels. As shown in FIG. 3A, an interested area or an examined window 302 of an image is divided into overlapping cells 304, which may include, for example, a 3×3 or 4×4 pixel array in each cell. Each pixel may be represented by a value of gray level. For each cell 304 as shown in FIG. 3B, an LBP label can be generated. As shown in FIG. 3C, for each pixel in cell 304, a center pixel 306 is compared with each of its neighbors along a circle clockwise or counterclockwise, for example, 8 neighbors for a cell of 3×3 pixel array from right, bottom, left, to top of center pixel 306. When the value of center pixel 306 is greater than a neighbor's value, a "1" is assigned to the bit representing the neighbor. Otherwise, a "0" is assigned to the bit representing the neighbor. This produces an LBP label represented by an 8-digit binary number, which is usually converted to decimal number for convenience. A detailed example of determining an LBP label for a cell is illustrated in FIGS. 4A-4D.

FIG. 4A illustrates several example image pixel values, with a center image pixel value of 40 and eight neighboring image pixel values. In FIG. 4B, a difference is generated for each neighbor by subtracting the center image pixel value from each of the neighboring image pixel values. In FIG. 4C, a binary value is generated for each neighboring pixel using a threshold of, for example, 0. Thus, all resultant negative difference values in FIG. 4B are converted to zeroes, and all remaining values in FIG. 4B are converted to ones. In FIG. 4D, an LBP label is generated for the center image pixel by either concatenating the 8 binary values representing the 8 neighboring image pixels to generate a 8-bit binary number, for example "0b10101010," or converting the 8-bit binary number into a decimal LBP label value of, for example, 170, for the center image pixel.

Referring back to FIG. 3D, after LBP labels for all cells in the interested area are generated, the LBP labels of all pixels in the interested area can be used to generate a histogram 308 indicating the frequency of occurrence of each decimal number, which represents feature vectors for the interested area of the image. Each of the LBP labels may fall anywhere on a histogram with 255 slots. Certain histogram patterns may represent corners, edges, texture, gradients etc. in an image. The histogram may optionally be normalized. The feature vectors can then be processed based on statistics or heuristics using support vector machine or other machine-learning techniques for identifying or detecting an object from the image through, for example, face recognition or texture analysis.

Currently, most of the above process is generally done in software after images are captured, converted to digital data, and stored. The software is executed to convert the stored image files to LBP labels. Due to its massive parallel computing requirement for LBP generation and feature extraction, the process becomes complicated and power hungry in digital data processing.

II. Address-Event Representation

Address-Event Representation is a biologically inspired asynchronous protocol for encoding and communicating sensory data between a transmitting sensor (transmitter) and a receiving processing unit (receiver). In an AER image sensor sensitive to light intensity, sensor pixels may collect photons and generate an integration electrical signal, for example, a voltage signal. Events are signaled when individual pixels reach a threshold voltage and request the bus for initiating a communication with an outside receiver. An event to be transmitted has the simple form of the address of the transmitting pixel (hence the origin of the term address-event).

Figure 5:
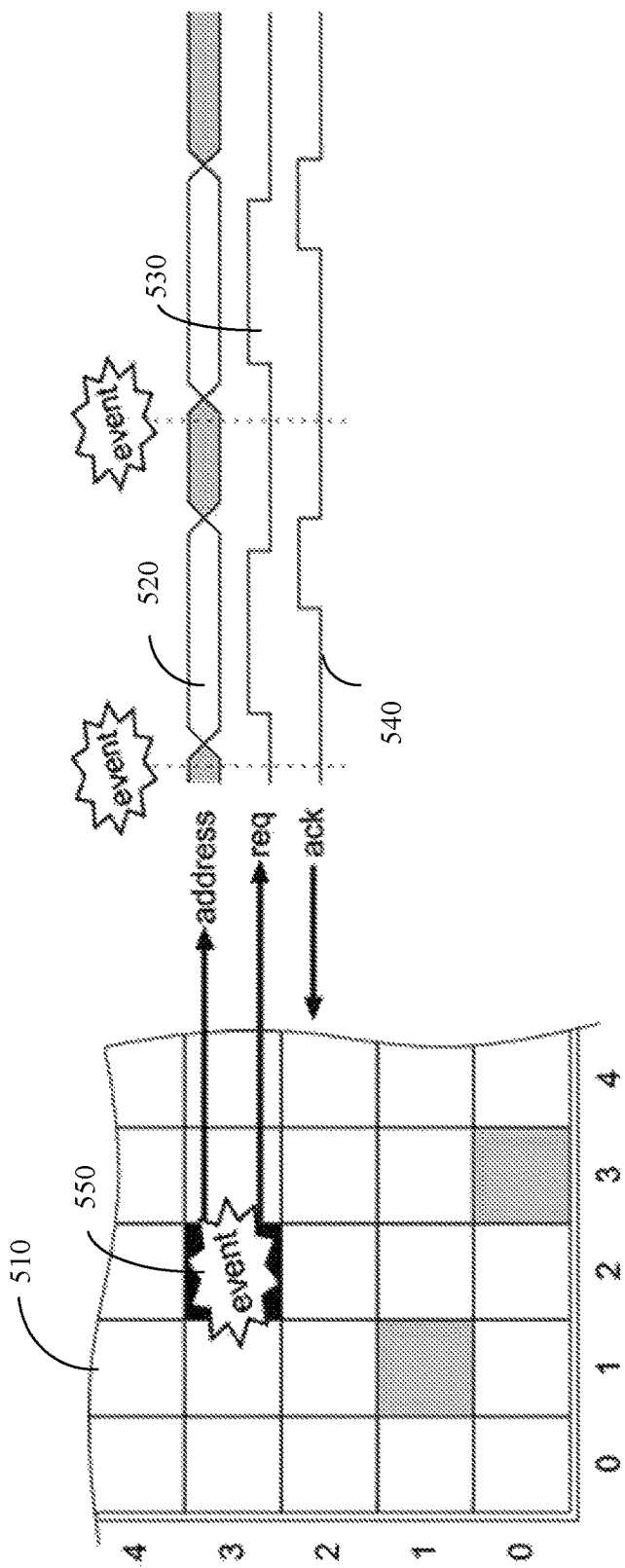
FIG. 5 illustrates an example of an address event representation (AER)-based image sensor.

FIG. 5 illustrates an example of an address event representation (AER) image sensor. As shown in FIG. 5, a two dimensional light sensor array 510 is illuminated by an optical image. Each pixel in light sensor array 510 may generate a voltage or current signal associated with the intensity of the light illuminating the pixel. For example, the pixel may convert the optical signal on the pixel to an electrical current or integrate the current, for example, photodiode current, using a capacitive tank to generate a voltage signal. When this voltage signal reaches a threshold level on, for example, pixel 550, an event is generated. When an event is generated, a request bit REQ 530 may be set to HIGH, and the address, for example, the X and Y coordinates associated with the sensor pixel generating the event, such as (2,3) for pixel 550, is outputted on an address bus 520. After an acknowledge bit ACK 540 is received from a receiver, the REQ bit may be set to LOW, and the REQ bit and address for another event can be transmitted on the same bus and bit line.

Figure 6:
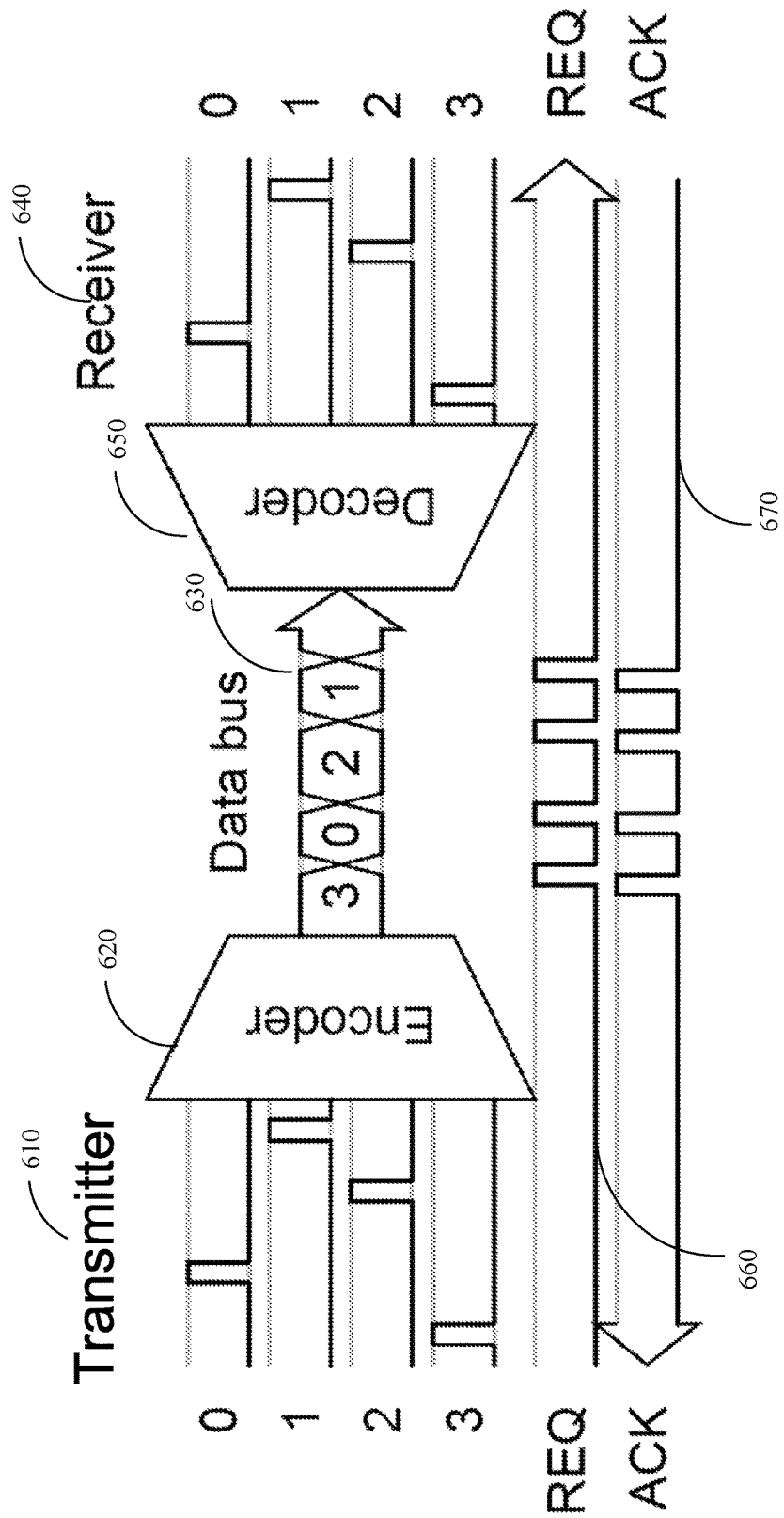
FIG. 6 is an example diagram illustrating the transmission of address events from a transmitter to a receiver.

FIG. 6 is an example diagram illustrating the transmission of address event from a transmitter 610 to a receiver 640. When an event is generated on a pixel, for example, pixel 3 in transmitter 610, the address of pixel 3 is encoded by an encoder 620 on the transmitter and is latched onto a data bus 630 to be transmitted to receiver 640. A request signal is set on REQ bit line 660 as well. When receiver 640 receives the request signal and address data for an event, receiver 640 may send an acknowledge signal on ACK bit line 670. Upon receiving the acknowledge signal, REQ bit line 660 may be reset to allow another event request and address data to be sent to receiver 640. The address data may be kept on data bus 630 until a request for a next event is asserted. For example, in FIG. 6, events are generated on pixels 3, 0, 2, and 1 sequentially; the addresses of pixels 3, 0, 2, and 1 are transmitted sequentially to receiver 640. A time period for an address of an event on data bus 630 may represent the time between the event and a next event. Upon receiving the sequence of address data with embedded timing information, receiver 640 can decode the address data and duplicate the events or generate an image, for example, a gray-scale image or a binary image, on receiver 640, without using ADCs.

A main advantage of AER image sensors is that they do not need to be queried for information. Rather, they push information to the receiver once they have gathered it. Thus, virtually no power is used by the pixel until an event is generated. Encoding the analog light intensity data as a stream of digital pulses also provides noise immunity because of the digital quantization and redundancy.

In some implementations, the intensity of the light illuminating each pixel may be represented by the frequency of events generated by each pixel. For example, the voltage signal for a pixel may be reset after an event is generated, and the current signal is integrated again after the reset. Thus, strong light makes a pixel generate events at a higher rate while weak light makes a pixel generate events at a proportionally lower rate. As a result, an AER system may represent light intensity on a pixel as a frequency-modulated sequence of addresses, where the time interval between identical addresses (same pixel) is inversely proportional to the intensity of the light incident on the pixel. The frequency-modulated sequence of addresses with time interval between identical addresses inversely proportional to the optical signal intensity can be transmitted to a receiving unit, and the image can be reconstructed by the receiving unit as a gray-scale image based on the frequencies of all pixels in the image or a binary image for local binary pattern generation without using ADCs.

Figure 7:
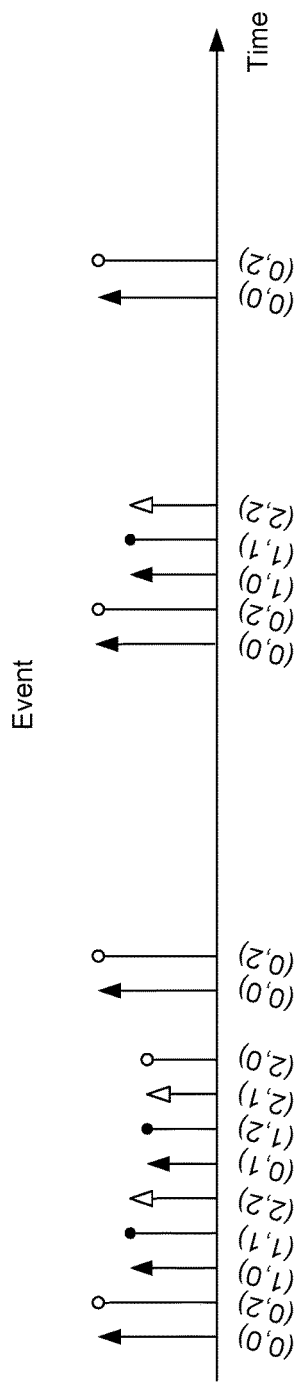
FIG. 7A illustrates an image cell with a 3×3 pixel array.
FIG. 7B illustrates events generated by an AER image sensor for the cell illustrated in FIG. 7A.

FIG. 7A illustrates an image cell 700 with a 3×3 sensor pixel array, where a number in each sensor pixel represents the intensity of the light incident on the sensor pixel represented by, for example, different gray-scale levels. For example, in FIG. 7A, sensor pixels (0, 0) and (0, 2) have a gray scale level of 80, sensor pixels (1, 0), (1, 1), and (2, 2) have a gray scale level of 40, and sensor pixels (0, 1), (1, 2), (2, 0), and (2, 1) have a gray scale level of 20.

FIG. 7B illustrates events generated by an AER image sensor for cell 700 illustrated in FIG. 7A. As shown in FIG. 7B, because the intensity of the incident light on pixels (0, 0) and (0, 2) is higher than the intensity of the incident light on other pixels, pixels (0, 0) and (0, 2) generate events at a higher rate than other pixels, while pixels (0, 1), (1, 2), (2, 0), and (2, 1) generate events at a lower rate than other pixels because the intensity of the incident light on pixels (0, 1), (1, 2), (2, 0), and (2, 1) is lower than the intensity of the incident light on other pixels. Based on the rate of events generated on each pixel, the intensity of incident light on each pixel can be determined for LBP label generation without using ADCs. For example, if the rate of events generation on a pixel is greater than a threshold rate, a "1" may be assigned to the pixel; otherwise, a "0" may be assigned to the pixel. In this way, a binary bit map may be generated for all pixels of interest.

In some implementations of this disclosure, the electrical signal generated by each pixel can be compared with a reference level once in each sample period. Alternatively, the result of the comparison between the generated electrical signal and the reference level may be read and/or compared once in each sample period. An event generated on a pixel indicates that the intensity of the incident light on the pixel is greater than a threshold level. Based on the addresses of the pixels that generate events, a binary image may be generated at the reference level. In the next sample period, the reference level may change, and another binary image may be generated at a new reference level similarly.

In some implementations, when multiple events are generated at the same time on different pixels, various methods, such as using an event arbitrator, can be used by the address encoder to encode and send the addresses of the pixels generating the events, as known to a skilled person in the art.

III. AER-Based Direct LBP Generation

Figure 8:
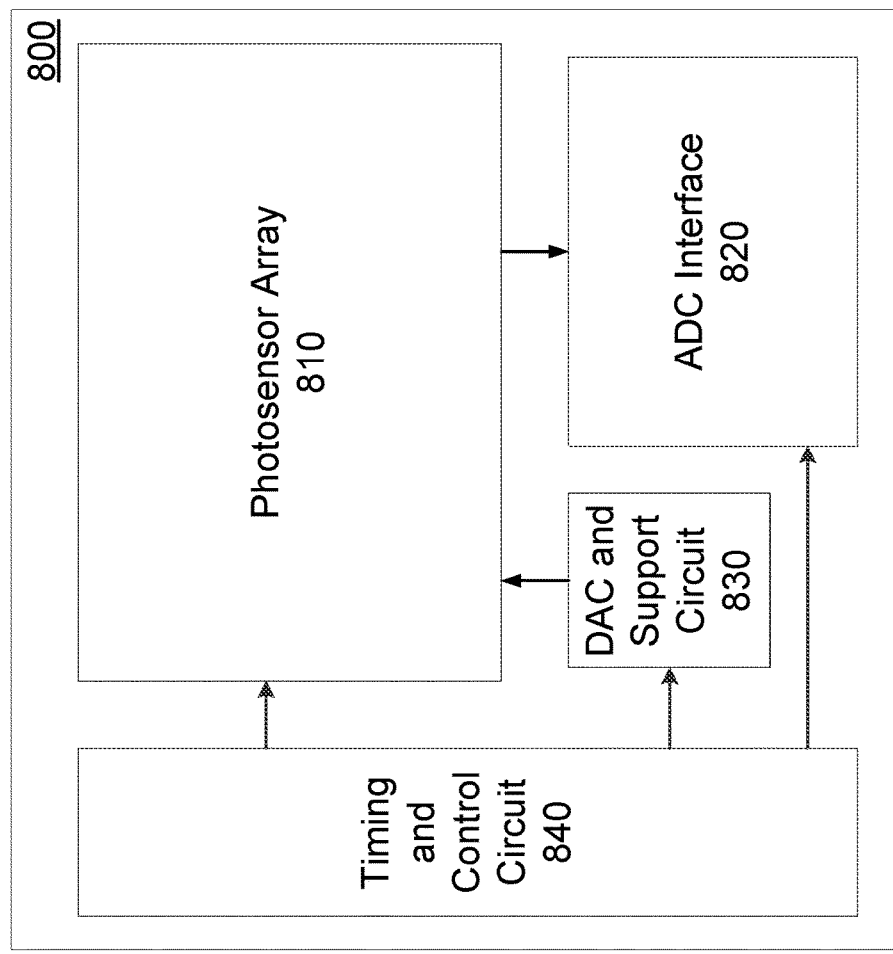
FIG. 8 illustrates an active pixel sensor (APS) image sensor using a photosensor array and an analog-to-digital converter (ADC) interface.

FIG. 8 illustrates an active pixel sensor (APS) image sensor 800 using a photosensor array and an ADC interface, such as a single global ADC or an ADC array. Image sensor 800 may include a number of logical units, such as a photosensor array 810, an ADC interface 820, a digital-to-analog converter (DAC) and support circuitry 830, and a time and control circuit 840. ADC interface 820 may be formed of a plurality of ADC devices, for example, one ADC device for each column of photosensor array 810, or a time-domain multiplexed global ADC. There may be two inputs to each ADC device, one for a pixel reference signal (or reset value) and the other for a pixel measurement signal. Each ADC may include internal offset correction and a correlated double sampling (CDS) configured to reduce noise, such as fixed pattern noise (FPN) caused by parameter variations from pixel to pixel. The CDS circuit may also be a stand-alone unit outside of ADC interface 820. The CDS operation may be done, for example, by (1) sampling and holding the pixel reference (or reset) signal; (2) sampling and holding the pixel measurement signal in an integration period; and (3) subtracting the pixel reference signal from the pixel measurement signal to generate a correlated pixel measurement signal. The correlated pixel measurement signal value is then converted to digital data by the ADC device and saved in a digital image data file for post-processing, such as LBP generation.

The APS image sensor using an ADC array, such as image sensor 800 of FIG. 8, may consume a large amount of power because the pixel measurement signal from each pixel is converted into a digital signal by an ADC. Furthermore, additional processing is needed to generate LBP labels from the digital image data file, which may require a significant amount of memory and processing resources, and may consume a large amount of power.

Techniques disclosed herein generate direct LBP output data for feature detection using a global variable reference generator, such as a single-slope ramp signal generator, and an AER-based image sensor to sort 2-dimensional pixel data. No ADC circuit for converting analog sensor signals to digital image data is required in the image sensor. The power consumption using the techniques disclosed herein can be much lower than the conventional techniques such as an image sensor with a pixel array and an ADC array and software-based LBP generation as described above.

Figure 9:
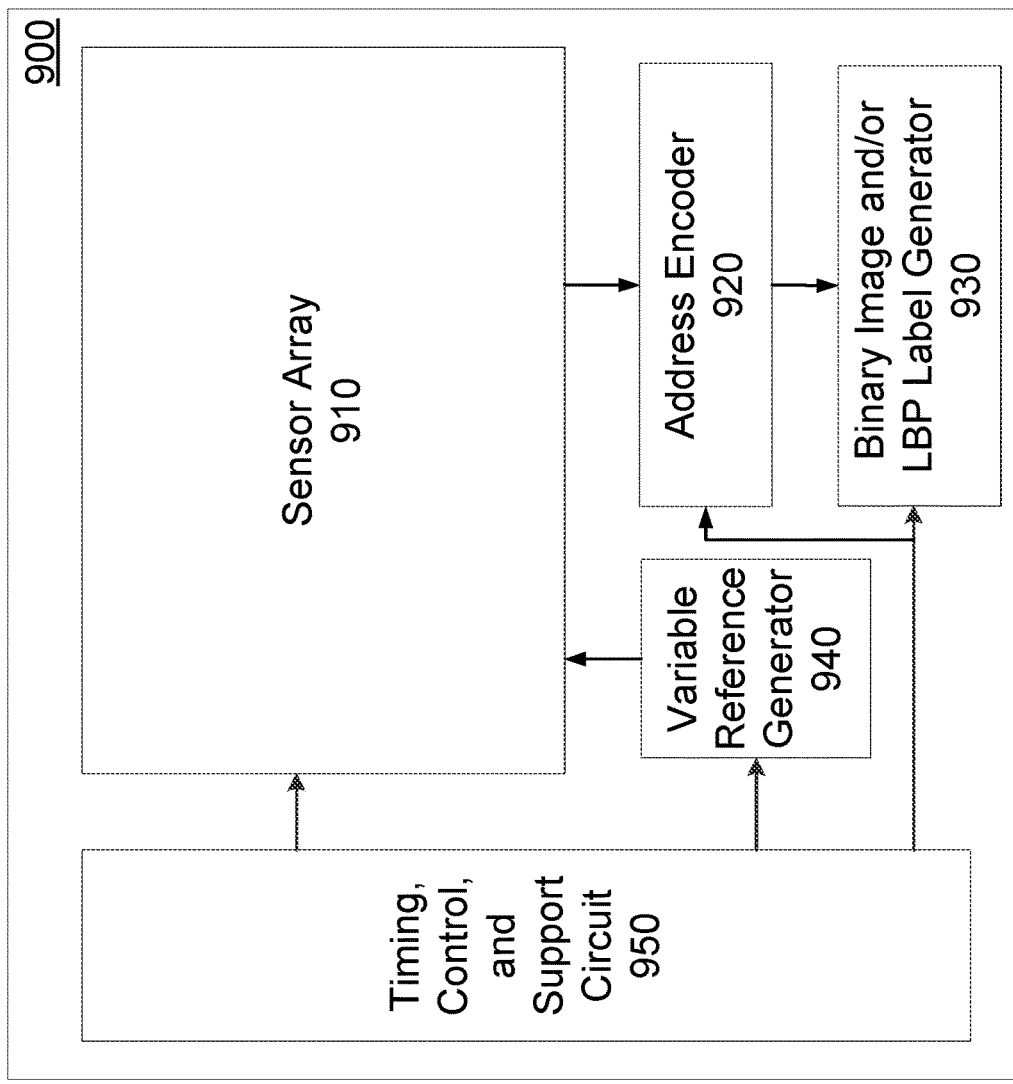
FIG. 9 is a block diagram of an AER-based image sensor for direct local binary pattern generation.

FIG. 9 is a block diagram of an AER-based image sensor 900 for direct LBP binary bit map generation. AER-based image sensor 900 includes a sensor array 910, an address encoder 920, a variable reference generator 940, and a timing, control, and support circuit 950. AER-based image sensor 900 may also include a binary image and/or LBP label generator 930.

Each sensor pixel in sensor array 910 may include a light sensor for converting an optical signal into a voltage or current signal. Each sensor pixel may include an integrator for integrating the converted voltage or current signal, and a comparator for comparing the integrated voltage or current signal with a reference level set by variable reference generator 940 that generates a global reference signal. When the integrated signal is less than the reference signal, no event is being generated at the sensor pixel. When the integrated signal is greater than the reference signal, an event, such as a spike or a digital pulse and the associated address of the sensor pixel, may be generated by the sensor pixel and sent to the address encoder 920.

Address encoder 920 may include a horizontal (column) and a vertical (row) address encoders for encoding the column (x) and row (y) coordinates of sensor pixels that generate events. When only a single event is generated by all the pixels of interest, it is fairly straightforward to encode the address of the sensor pixel that generates the event. When simultaneous events occur on more than one pixel, techniques such as arbitration, collision detection, or other techniques may be used to identify the sensor pixels that generate the events and send the addresses of these sensor pixels on a bus to binary image and/or LBP label generator 930.

In response to receiving the addresses of the sensor pixels that generate the events at a reference level from address encoder 920, binary image and/or LBP label generator 930 may create or update a binary image at the reference level for the sensor pixels of interest based on the addresses of the sensor pixels that generate the events. For example, as described above, in some implementations, the intensity of the light illuminating each sensor pixel may be represented by the frequency (or rate) of events generated by each sensor pixel. In such implementations, a binary image may be generated based on the rate of events generated on each sensor pixel. For example, if the event rate of a sensor pixel is equal to or greater than a threshold rate, a "1" may be assigned to an image pixel corresponding to the sensor pixel; otherwise, a "0" may be assigned to the image pixel. As also described above, in some implementations, an event generated on a sensor pixel may indicate that the intensity of the light incident on the pixel is greater than a threshold level. In such implementations, based on the addresses of the sensor pixels that generate events, a binary image may be created or updated for the threshold level. For example, if an event is generated on a sensor pixel, a "1" may be assigned to an image pixel corresponding to the sensor pixel on the binary image; if no event is generated on a sensor pixel, a "0" may be assigned to the image pixel corresponding to the sensor pixel on the binary image.

Variable reference generator 940 may generate a reference signal at different levels and feed the reference signal to all pixels of interest. The reference signal may be a rising or falling continuous ramping. For example, the reference signal may increase from a minimum level, such as 0 volt (V), to a maximum level, such as a supply voltage, monotonically or linearly. The reference signal may also decrease from a maximum level to a minimum level monotonically or linearly. The reference signal may be at a different level in each sampling period during which a binary image may be generated. The sampling period may be less than a frame rate of the images to be captured, such as a small fraction of the frame rate of the images to be captured.

When the reference level changes in a different sampling period, a new binary image may be generated or updated at the new reference level as described above. When the binary value of an image pixel changes from one binary image to a subsequent binary image as the reference level changes, the LBP label for the image pixel may be read out based on the binary values of the neighbor pixels on the one binary image or the subsequent binary image. The LBP label for the image pixel may be added to an LBP histogram for feature extraction and detection as described above with respect to FIG. 3D. As the reference level changes, LBP labels for other image pixels may be read out and added to the LBP histogram. In this way, LBP labels for all image pixels of interest may be generated as the reference level changes between the minimum level and the maximum level. Histogram of the LBP labels for all the pixels of interest can also be generated for feature extraction and detection as LBP labels for the image pixels are generated.

As also described above with respect to FIG. 6, AER-based image sensor 900 may also be used to generate gray-scale images rather than binary images.

AER-based image sensor 900 can tolerate random mismatch, such as FPN. FPN is a major factor causing the degradation of image quality. FPN is normally generated by the device mismatching errors in sensor pixel circuits such as threshold voltage variations and variations in MOS transistor size. FPN needs to be reduced or calibrated. AER-based image sensor 900 may also include a CDS circuit as discussed above, for example, at the comparator of each sensor pixel.

Even though the above embodiments are described in specific examples, their implementations are not limited to the specific examples described above. Rather, embodiments of a possible AER-based image sensor can be implemented with or without some functional blocks, by integrating several function blocks into one unit or dividing one function block into several functional blocks, or implementing some functional blocks in different chips or printed circuit boards (PCBs), or in software. For example, binary image and/or LBP label generator 930 may be implemented outside of AER-based image sensor 900, such as on a different chip or in software or firmware. As another example, variable reference generator 940 may be separate from image sensor 900, which may include a global reference signal input port for receiving a global reference signal from variable reference generator 940.

Figure 10:
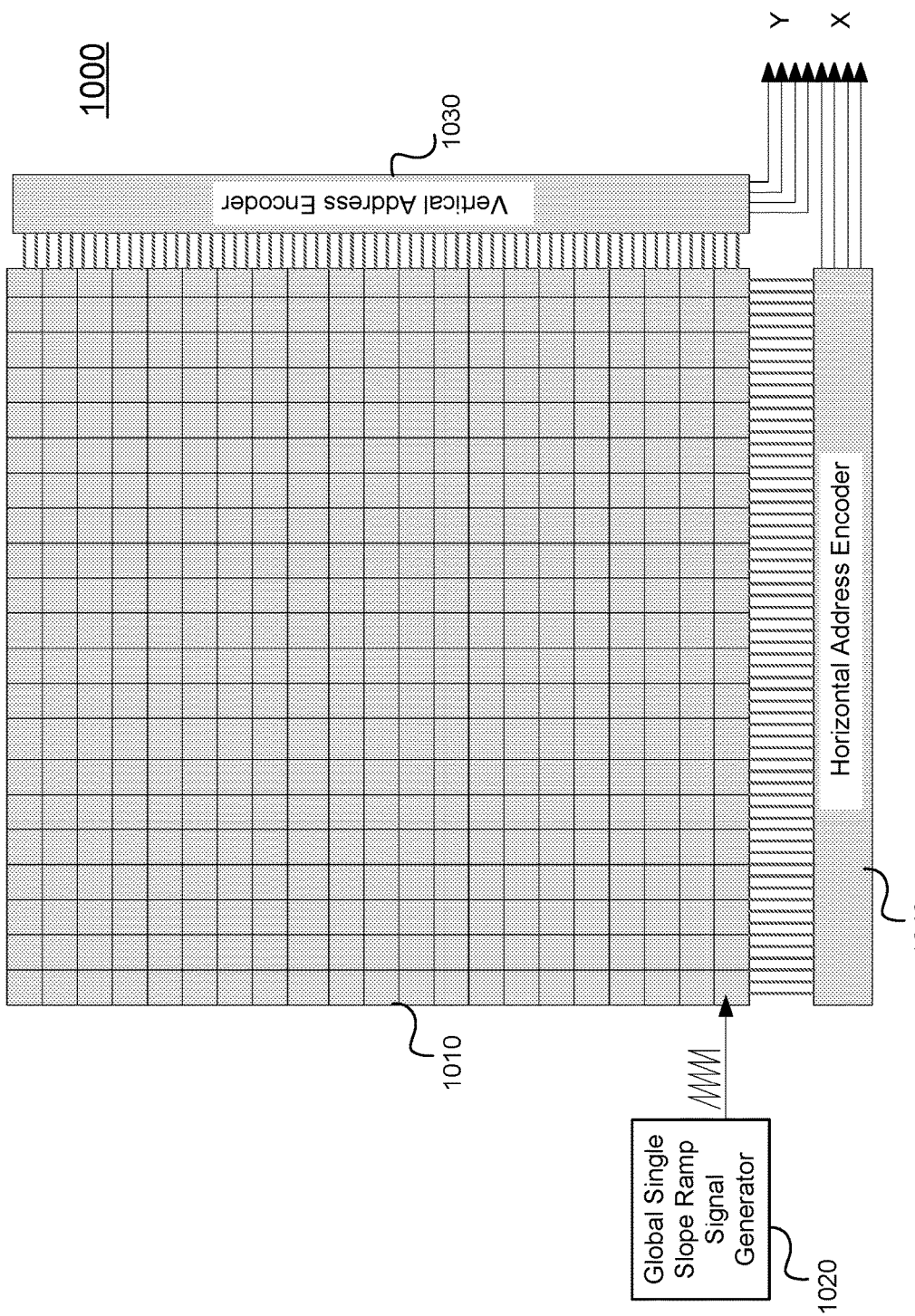
FIG. 10 illustrates an example AER-based image sensor using a single slope ramp signal generator.

FIG. 10 illustrates an example AER-based image sensor 1000 using a single slope ramp signal generator without a binary image or LBP label generator. AER-based image sensor 1000 includes a global single-slope ramp signal generator 1020, a 2-dimensional pixel array 1010, and a vertical address encoder 1030 and a horizontal address encoder 1040 coupled to 2-dimensional pixel array 1010. AER-based image sensor 1000 may also include a timing circuit (not shown) for clocking and controlling other functional blocks of AER-based image sensor 1000.

Global single slope ramp signal generator 1020 is coupled to each pixel in 2-dimensional pixel array 1010. Global single slope ramp signal generator 1020 may generate a controllable single-slope linear signal and feed the single-slope linear signal to each pixel in 2-dimensional pixel array 1010. The resolution or unit step of the ramp signal generator may be determined based on the required resolution and accuracy for feature extraction and detection. The single slope may be a rising slope or a falling slope. The slope of global single-slope ramp signal generator 1020 may be determined based on, for example, sampling rate, frame rate, and mode of operation of AER-based image sensor 1000. For example, global single-slope ramp signal generator 1020 may generate one reference level or one slope in one sampling period, or generate one slope for one image frame.

As described above with respect to claim 9, 2-dimensional pixel array 1010 may include sensor pixels that can convert optical signals into electrical signals, and generate events when the electrical signals are greater than a reference level generated by global single-slope ramp signal generator 1020. Each sensor pixel may include a sensing element for sensing an optical signal and a comparator for comparing the generated electrical signal with the reference level. Horizontal address encoder 1040 and vertical address encoder 1030 are configured to determine the column (x) and row (y) addresses of the pixels that generate events, and send the determined column and row addresses for processing, such as generating gray-scale images, binary images, LBP labels, or histogram of LBP labels as described above, by other hardware units or software modules.

As can be seen from FIGS. 9 and 10, no ADC is needed in the AER-based image sensors. The power consumption for the comparators and address encoders, and thus the AER-based image sensors can be very low. Furthermore, the AER-based image sensor can provide direct binary image output or LBP label output. Therefore, less post processing is needed for LBP label generation compared with image sensors that provide gray-scale images. As such, the overall signal processing operations and time as well as total power consumption can be reduced.

The following examples illustrate some embodiments of the operations of AER-based image sensors for direct binary image or LBP labels output.

FIG. 11A illustrates a 3×3 sensor pixel array with corresponding light intensity on each pixel in gray scale. FIGS. 11B-11J illustrate different binary images for the 3×3 sensor pixel array of FIG. 11A at different reference levels as the reference level increases from a level corresponding to 10 in gray scale to a level corresponding to 90 in gray scale. As shown in FIG. 11B, when the reference level corresponds to 10 in gray scale, events are generated at all nine sensor pixels; thus the values in the binary image are all "1s." When the reference level is increased to a level corresponding to 20 in gray scale, all sensor pixels except pixel (1,0) generate events, and a binary image as shown in FIG. 11C can be created with the value for image pixel (1,0) set to "0." When the reference level is increased to a level corresponding to 30 in gray scale, all sensor pixels except pixels (0,1), (1,0), and (2,1) generate events, and a binary image as shown in FIG. 11D can be generated with the values for image pixels (0,1), (1,0), and (2,1) set to "0." When the reference level is increased to a level corresponding to 40 in gray scale, only sensor pixels (0,0), (0,2), (1,1), (2,0), and (2,2) generate events, and a binary image as shown in FIG. 11E can be generated with the values for only image pixels (0,0), (0,2), (1,1), (2,0), and (2,2) set to "1." As the reference level is increased further to levels corresponding to 50, 60, 70, and 80 in gray scale, fewer sensor pixels generate events, and the resultant binary images can be shown by FIGS. 11F, 11G, 11H, and 11I, respectively, with fewer image pixels having a value of "1." When the reference level is increased to a level corresponding to 90 in gray scale, no sensor pixel generates events, and a binary image as shown in FIG. 11J can be created with values for all image pixels set to "0."

Figure 3D:
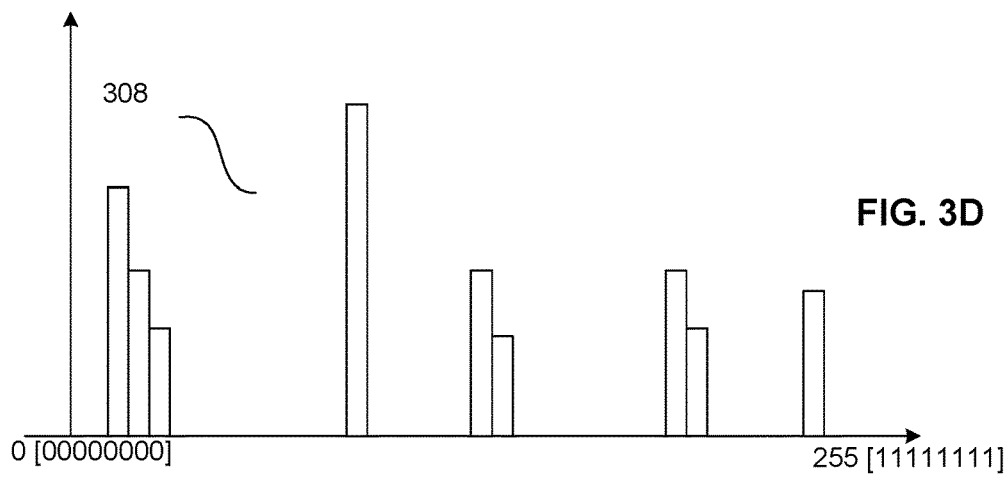

FIG. 12A illustrates a 3×3 sensor pixel array with corresponding light intensity on each pixel in gray scale. FIGS. 12B-12F illustrate different binary images for the 3×3 sensor pixel array of FIG. 12A at different reference levels during a LBP label generation, according to an embodiment of this disclosure. In this example, the reference level increases from a level corresponding to 10 in gray scale. As shown in FIG. 12B, when the reference level corresponds to 10 in gray scale, events are generated as all nine sensor pixels, thus the values in the binary image are all "1s." When the reference level is increased to a level corresponding to 20 in gray scale, all sensor pixels except pixel (1,0) generate events, and a binary image as shown in FIG. 12C can be generated with the value for image pixel (1,0) set to "0." When the reference level is increased to a level corresponding to 30 in gray scale, all sensor pixels except pixels (0,1), (1,0), and (2,1) generate events, and a binary image as shown in FIG. 12D can be generated with the values for image pixels (0,1), (1,0), and (2,1) set to "0." When the reference level is increased to a level corresponding to 40 in gray scale, only sensor pixels (0,0), (0,2), (1,1), (2,0), and (2,2) generate events, and a binary image as shown in FIG. 12E can be generated with the values for only image pixels (0,0), (0,2), (1,1) (2,0), and (2,2) set to "1." When the reference level is increased to a level corresponding to 50 in gray scale, only sensor pixels (0,0), (0,2), (2,0), and (2,2) generate events, and a binary image as shown in FIG. 11E can be generated with the values for only image pixels (0,0), (0,2), (2,0), and (2,2) set to "1." Because the binary value for the center image pixel (1,1) has changed from "1" in FIG. 12E to "0" in FIG. 12F, the LBP label for pixel (1,1) can be read out as "10101010" based on the binary image in FIG. 12E or FIG. 12F (if a "0" is assigned in the LBP label to a pixel whose gray scale level is equal to the gray scale level of the center pixel). The decimal value of 170 or binary value of 0b10101010 of the LBP label may be added to the LBP histogram as shown in FIG. 3D.

FIG. 13A illustrates a 3×3 sensor pixel array with corresponding light intensity on each pixel in gray scale. FIGS. 13B-13G illustrate different binary images for the 3×3 sensor pixel array of FIG. 13A at different reference levels during LBP label generation, according to one embodiment of this disclosure. In this example, the reference level decreases from a maximum value. When the reference level is high, for example, corresponding to 90 in gray scale, no event is generated by the sensor pixel array; a "0" is assigned to each image pixel in the binary image as shown in FIG. 13B. When the reference is at a level corresponding to 80 in gray scale, an event is generated at sensor pixel (0,2), and a "1" can be assigned to image pixel (0,2) in the binary image shown in FIG. 13C. When the reference is at a level corresponding to 70 in gray scale, an event is generated at each of sensor pixel (0,2) and pixel (2,2), and a "1" can be assigned to image pixels (0,2) and (2,2) in the binary image shown in FIG. 13D. As the reference level further decreases, more events are generated in the sensor pixel array. When the reference is at a level corresponding to 60 in gray scale, an event is generated at each of sensor pixels (0,2), (2,0), and (2,2), and a "1" can be assigned to image pixels (0,2), (2,0), and (2,2) in the binary image shown in FIG. 13E. When the reference is at a level corresponding to 50 in gray scale, an event is generated at each of sensor pixels (0,0), (0,2), (2,0), and (2,2), and a "1" can be assigned to image pixels (0,0), (0,2), (2,0), and (2,2) in the binary image shown in FIG. 13F. When the reference is at a level corresponding to 50 in gray scale, an event is generated at each of sensor pixels (0,0), (0,2), (1,1), (2,0), and (2,2), and a "1" can be assigned to image pixels (0,0), (0,2), (1,1), (2,0), and (2,2) in the binary image shown in FIG. 13G. Since the binary value for the center pixel (1,1) has changed from "0" in FIG. 13F to "1" in FIG. 13G, the LBP label for image pixel (1,1) can be read out as "10101010" based on the binary image in FIG. 13G or FIG. 13F (if a "0" is assigned in the LBP label to a pixel whose gray scale level is equal to the gray scale level of the center pixel). The decimal value of 170 or binary value of 0b10101010 of the LBP label may be added to the LBP histogram as shown in FIG. 3D.

IV. Example Method

Figure 14:
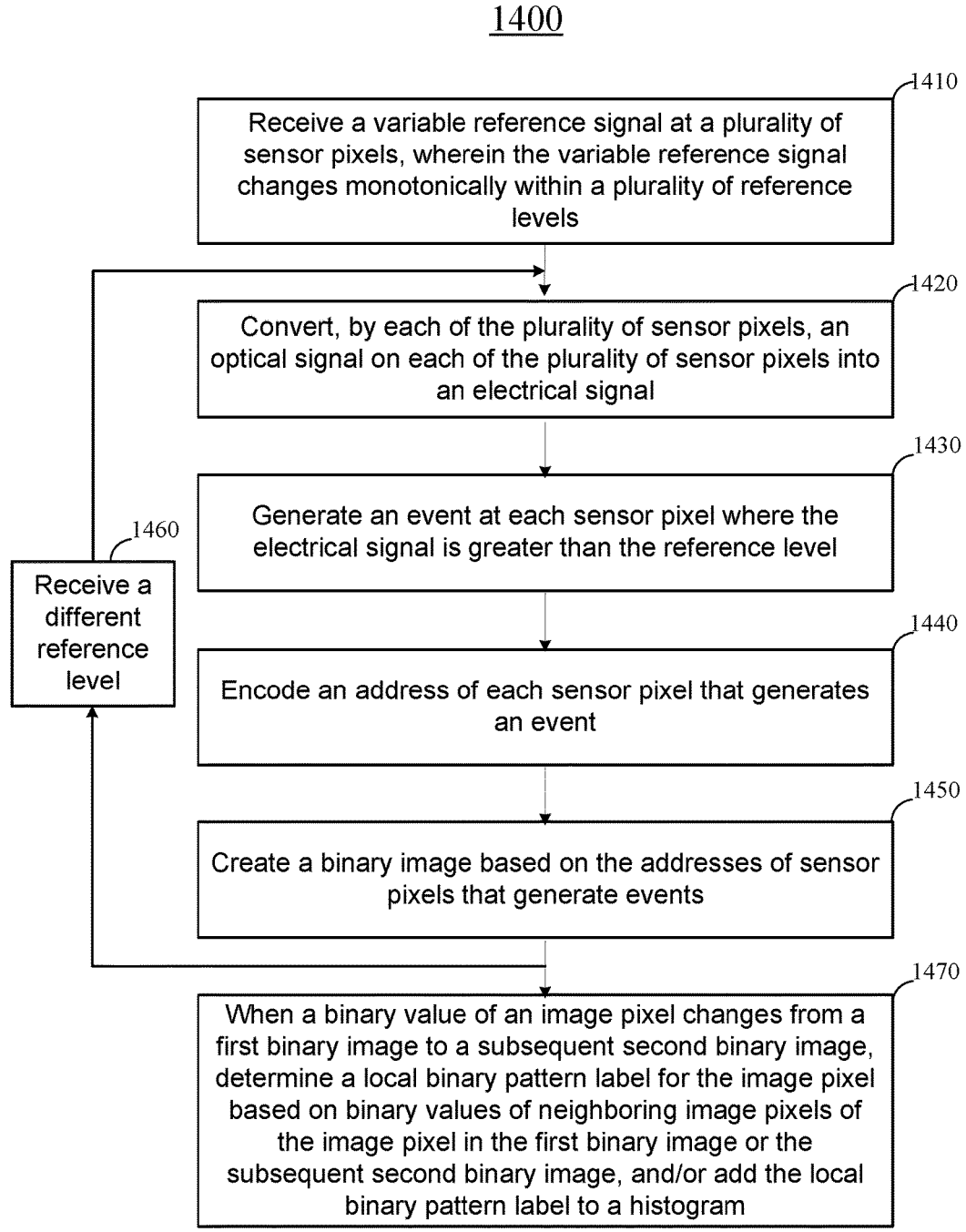
FIG. 14 is a flow chart illustrating an example method of AER-based direct local binary pattern generation.

FIG. 14 is a flow chart illustrating an example method of AER-based direct local binary pattern generation. It is noted that even though FIG. 14 describes the operations as a sequential process, some of the operations can be performed in parallel or concurrently. In addition, the order of the operations may be rearranged. An operation may have additional steps not included in the figure. Some operations may be optional, and thus may be omitted in various embodiments. Some operations described at one block may be performed together with operations at another block. Furthermore, embodiments of the methods may be implemented in hardware, software, firmware, middleware, microcode, hardware description languages, or any combination thereof.

At block 1410, a plurality of sensor pixels of an image sensor receives a variable reference signal. The variable reference signal may change monotonically within a plurality of reference levels. As described above with respect to FIGS. 9 and 10, the reference signal may be generated by a variable reference generator that may generate a reference signal at different levels and feed the reference signal to all pixels of interest in the image sensor. The reference signal may be a rising or falling curve between a minimum level and a maximum level, monotonically or linearly. The reference signal may be set at a different level in each sampling period. In some embodiments, the reference signal may be generated by a single-slope ramp signal generator as described with respect to FIG. 10. The resolution or unit step of the single-slope ramp signal generator may be determined based on the required resolution or accuracy for feature extraction and detection. The single slope may be a rising slope or a falling slope. The slope of the single-slope ramp signal generator may be determined based on, for example, sampling rate, frame rate, and mode of operation of AER-based image sensors. Means for performing the function at block 1420 may include, but are not limited to, for example, sensor array 940 of FIG. 9 or 2-dimensional pixel array 1010 of FIG. 10. The variable reference signal may be generated by, for example, variable reference generator 940 of FIG. 9, global single-slope ramp signal generator of FIG. 10, or a stand-alone variable signal generator separate from the image sensor.

Operations at blocks 1420-1460 may be performed for each reference level of a plurality of reference levels of the variable reference signal. At block 1420, each of the plurality of sensor pixels converts an optical signal incident on each of the plurality of pixels into an electrical signal. The plurality of sensor pixels may form a 2-dimensional sensor pixel array. Each of the plurality of sensor pixels may include an optical sensor for converting an optical signal to a voltage or current signal. The optical sensor may be an active complementary metal-oxide-semiconductor (CMOS) optical sensor. Each sensor pixel may also include an integrator for integrating the converted voltage or current signal. Means for performing the function at block 1420 may include, but are not limited to, for example, sensor array 940 of FIG. 9 or 2-dimensional pixel array 1010 of FIG. 10.

At block 1430, each of the plurality of sensor pixels compares the reference level and the electrical signal, and generates an event at each sensor pixel on which a condition based on a comparison between the electrical signal and the reference level is met. Each sensor pixel may include a comparator for comparing the integrated voltage or current signal with the received reference level. The condition based on the comparison between the electrical signal and the reference level may be met when the electrical signal is one of greater than, no less than, less than, or no greater than the reference level. For example, in some embodiments, when the integrated signal is lower than the reference level, no event is being generated at the sensor pixel; when the integrated signal is no less than the reference signal, an event, such as a spike or a digital pulse, may be generated at the sensor pixel. As another example, in some embodiments, when the integrated signal is lower than the reference level, an event, such as a spike or a digital pulse, may be generated at the sensor pixel; when the integrated signal is no less than the reference signal, no event is being generated at the sensor pixel. In some embodiments, each sensor pixel may include a CDS circuit to reduce noise, such as fixed pattern noise due to parameter variations from pixel to pixel. Means for performing the function at block 1430 may include, but are not limited to, for example, sensor array 940 of FIG. 9 or 2-dimensional pixel array 1010 of FIG. 10 as described above.

At block 1440, the address of each sensor pixel that generates an event is encoded. The encoded address of each pixel may include the column (x) and row (y) coordinates of the sensor pixel in a 2-dimensional sensor pixel array. When simultaneous events occur on more than one sensor pixel, the address of each sensor pixel that generates an event may be identified and encoded. Means for performing the function at block 1440 may include, but are not limited to, for example, address encoder 920 of FIG. 9 or vertical address encoder 1030 and horizontal address encoder 1040 of FIG. 10.

At block 1450, a binary image is created for the reference level based on the addresses of sensor pixels that generate events. For example, if an event is generated on a sensor pixel, a "1" is assigned to an image pixel corresponding to the sensor pixel; otherwise, a "0" is assigned to the image pixel. In some embodiments, if the rate of events of a sensor pixel is greater than a threshold rate, a "1" may be assigned to an image pixel corresponding to the sensor pixel; otherwise, a "0" may be assigned to the image pixel. Means for performing the function at block 1450 may include, but are not limited to, for example, binary image and/or LBP label generator 930 of FIG. 9. In some embodiments, means for performing the function at block 1450 may include a software executable on a processor or a firmware.

At block 1460, a different reference level may be received by the plurality of sensor pixels from, for example, variable reference generator 940 of FIG. 9, global single-slope ramp signal generator of FIG. 10, or a stand-alone variable signal generator.

Operations at blocks 1410-1460 can be performed iteratively as the reference signal changes from a low reference level to a high reference level or from a high reference level to a low reference level. For example, the reference signal may be increased or decreased gradually. For each iteration of blocks 1410-1460, a binary image may be generated for the plurality of pixels at the reference level. The operations at blocks 1410-1460 may be performed at a rate less than a frame rate of the images to be captured, such as, for example, at a small fraction of the frame rate of the images to be captured.

At block 1470, local binary pattern labels are generated for pixels that change binary value as the reference level changes. For example, when the binary value of an image pixel changes from a first binary image to a subsequent second binary image, the local binary pattern label for the image pixel may be read out based on the binary values of the neighbor pixels in the first binary image or the second binary image. Alternatively or additionally, the value of the local binary pattern label for the image pixel that changes binary value as the reference signal changes is added to a histogram. Means for performing the function at block 1470 may include, but are not limited to, for example, binary image and/or LBP label generator 930 of FIG. 9. In some embodiments, means for performing the function at block 1460 may include a software executable on a processor or a firmware.

As the reference signal changes between a minimum reference level and a maximum reference level, LBP labels for the pixels of interest in an image may be read out and the histogram of LBP labels for the image may be generated. Features of the image may be extracted and detected as described above with respect to FIGS. 2 and 3.

V. System Example

According to one or more aspects, any and/or all of the apparatus modules, circuitry, methods and/or method steps described in FIGS. 1-14 herein may be implemented by and/or in an electrical circuit or a computing device. Additionally or alternatively, any and/or all of the methods and/or method steps described herein may be implemented in computer-readable instructions, such as computer-readable instructions stored on a computer-readable medium, such as memory, storage or another computer-readable medium.

Figure 15:
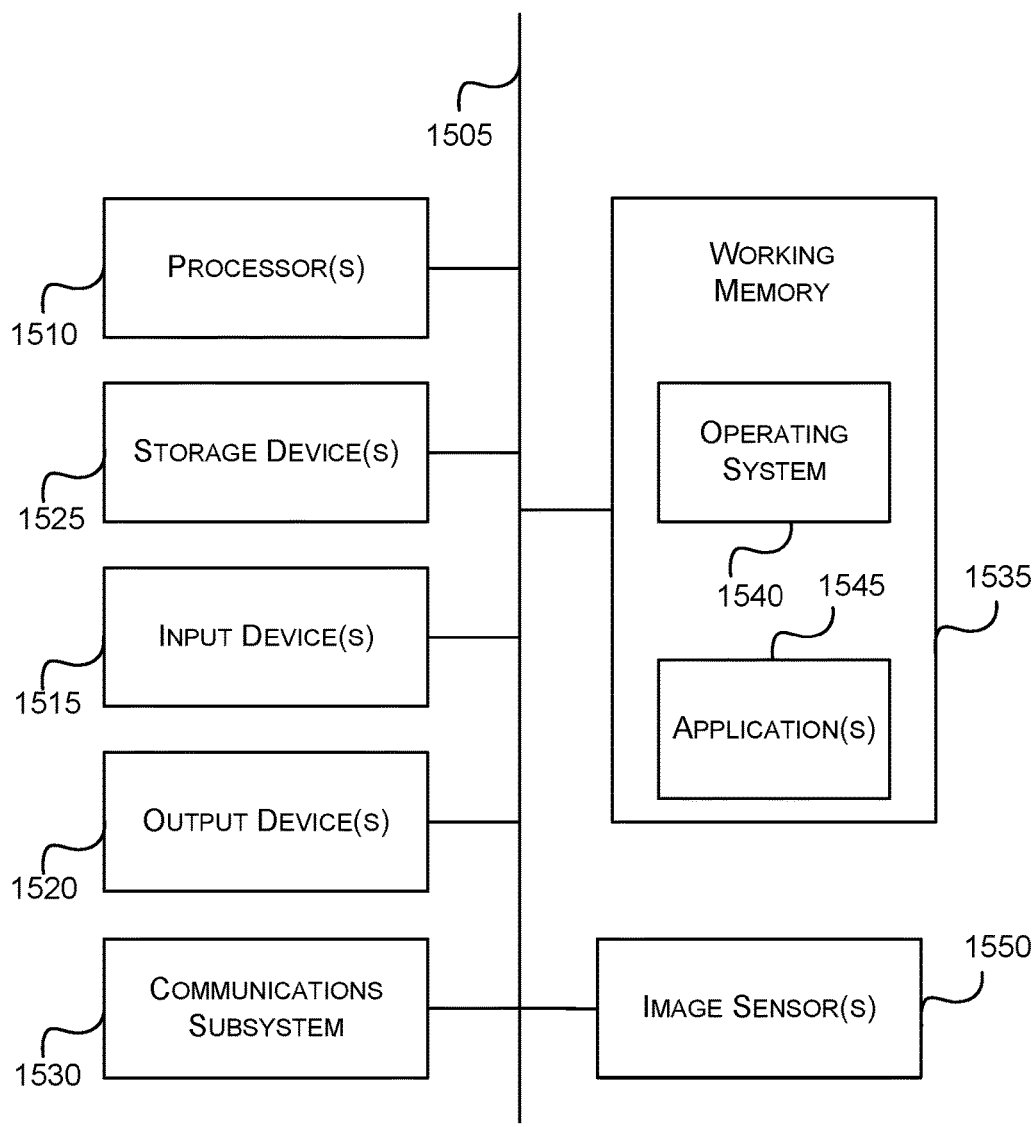
FIG. 15 illustrates an example of a computing system in which one or more embodiments may be implemented.

FIG. 15 illustrates an example computing device 1500 incorporating at least parts of the device or system employed in practicing embodiments of the disclosure. For example, computing device 1500 may represent some of the components of a mobile device or any other computing device. Examples of computing device 1500 include, but are not limited to, desktops, workstations, personal computers, supercomputers, video game consoles, tablets, smart phones, laptops, netbooks, or other portable devices. FIG. 15 provides a schematic illustration of one embodiment of computing device 1500 that may perform the methods provided by various other embodiments, as described herein, and/or may function as the host computing device, a remote kiosk/terminal, a point-of-sale device, a mobile multifunction device, a set-top box and/or a computing device. FIG. 15 is meant only to provide a generalized illustration of various components, any or all of which may be utilized as appropriate. FIG. 15, therefore, broadly illustrates how individual system elements may be implemented in a relatively separated or relatively more integrated manner.

Computing device 1500 is shown comprising hardware elements that may be electrically coupled via a bus 1505 (or may otherwise be in communication, as appropriate). The hardware elements may include one or more processors 1510, including, without limitation, one or more general-purpose processors and/or one or more special-purpose processors (such as digital signal processing chips, graphics acceleration processors, and/or the like); one or more input devices 1515, which may include, without limitation, one or more cameras sensors 1550, a touch screen, a mouse, a keyboard and/or the like; and one or more output devices 1520, which may include, without limitation, a display unit, a printer and/or the like. Sensors 1550 may include vision sensors, olfactory sensors and/or chemical sensors.

Computing device 1500 may further include (and/or be in communication with) one or more non-transitory storage devices 1525, which may comprise, without limitation, local and/or network accessible storage, and/or may include, without limitation, a disk drive, a drive array, an optical storage device, a solid-form storage device such as a random access memory ("RAM") and/or a read-only memory ("ROM"), which may be programmable, flash-updateable and/or the like. Such storage devices may be configured to implement any appropriate data storage, including, without limitation, various file systems, database structures, and/or the like.

Computing device 1500 may also include a communications subsystem 1530. Communications subsystem 1530 may include a transceiver for receiving and transmitting data or a wired and/or wireless medium. Communications subsystem 1530 may also include, without limitation, a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. Communications subsystem 1530 may permit data to be exchanged with a network, other computing devices, and/or any other devices described herein. In many embodiments, computing device 1500 may further comprise a non-transitory working memory 1535, which may include a RAM or ROM device, as described above.

Computing device 1500 may comprise software elements, shown as being currently located within the working memory 1535, including an operating system 1540, device drivers, executable libraries, and/or other code, such as one or more application programs 1545, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions may be used to configure and/or adapt a general purpose computer (or other device) to perform one or more operations in accordance with the described methods.

A set of these instructions and/or code might be stored on a computer-readable storage medium, such as storage device(s) 1525 described above. In some cases, the storage medium might be incorporated within a computing device, such as computing device 1500. In other embodiments, the storage medium might be separate from a computing device (e.g., a removable medium, such as a compact disc), and/or provided in an installation package, such that the storage medium may be used to program, configure and/or adapt a general purpose computer with the instructions/code stored thereon. These instructions might take the form of executable code, which is executable by computing device 1500 and/or might take the form of source and/or installable code, which, upon compilation and/or installation on computing device 1500 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices 1500 such as network input/output devices may be employed.

Some embodiments may employ a computing device (such as computing device 1500) to perform methods in accordance with the disclosure. For example, some or all of the procedures of the described methods may be performed by computing device 1500 in response to processor 1510 executing one or more sequences of one or more instructions (which might be incorporated into operating system 1540 and/or other code, such as an application program 1545) contained in working memory 1535. Such instructions may be read into working memory 1535 from another computer-readable medium, such as one or more of storage device(s) 1525. Merely by way of example, execution of the sequences of instructions contained in working memory 1535 might cause processor(s) 1510 to perform one or more procedures of the methods described herein.

The terms "machine-readable medium" and "computer-readable medium," as used herein, refer to any medium that participates in providing data that causes a machine to operate in a specific fashion. In an embodiment implemented using computing device 1500, various computer-readable media might be involved in providing instructions/code to processor(s) 1510 for execution and/or might be used to store and/or carry such instructions/code (e.g., as signals). In many implementations, a computer-readable medium is a physical and/or tangible storage medium. Such a medium may take many forms, including, but not limited to, non-volatile media, volatile media, and transmission media. Non-volatile media include, for example, optical and/or magnetic disks, such as storage device(s) 1525. Volatile media include, without limitation, dynamic memory, such as working memory 1535. Transmission media include, without limitation, coaxial cables, copper wire and fiber optics, including the wires comprising the bus 1505, as well as the various components of communications subsystem 1530 (and/or the media by which communications subsystem 1530 provides communication with other devices). Hence, transmission media may also take the form of waves (including, without limitation, radio, acoustic and/or light waves, such as those generated during radio-wave and infrared data communications). In an alternate embodiment, event-driven components and devices, such as cameras, may be used, where some of the processing may be performed in analog domain.

Common forms of physical and/or tangible computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, any other memory chip or cartridge, a carrier wave as described hereinafter, or any other medium from which a computer may read instructions and/or code.

Various forms of computer-readable media may be involved in carrying one or more sequences of one or more instructions to processor(s) 1510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computing device 1500. These signals, which might be in the form of electromagnetic signals, acoustic signals, optical signals and/or the like, are all examples of carrier waves on which instructions may be encoded, in accordance with various embodiments of the invention.

Communications subsystem 1530 (and/or components thereof) generally will receive the signals, and bus 1505 then might carry the signals (and/or the data, instructions, etc., carried by the signals) to working memory 1535, from which processor(s) 1510 retrieves and executes the instructions. The instructions received by working memory 1535 may optionally be stored on a non-transitory storage device 1525 either before or after execution by processor(s) 1510.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, punch cards, paper tape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the embodiments described herein. Also, a number of steps may be undertaken before, during, or after the above elements are considered. Accordingly, the above description does not limit the scope of the disclosure.

What is claimed is:
1. A method comprising:
receiving a variable reference signal at a plurality of sensor pixels, wherein the variable reference signal changes monotonically within a plurality of reference levels, and wherein a same reference level is received at the plurality of sensor pixels at a given time; and
at each reference level of the plurality of reference levels:

converting, by each sensor pixel of the plurality of sensor pixels, an optical signal on each sensor pixel of the plurality of sensor pixels into an electrical signal;
generating an event at each sensor pixel on which a condition based on a comparison between the electrical signal and the reference level is met;
encoding an address of each sensor pixel that generates the event; and
creating a binary image for the reference level based on the address of each sensor pixel that generates the event.

2. The method of claim 1, wherein the condition based on the comparison between the electrical signal and the reference level is met when the electrical signal is one of greater than, no less than, less than, or no greater than the reference level.

3. The method of claim 1, further comprising:
when a binary value of an image pixel changes from a first binary image for a first reference level to a subsequent second binary image for a next reference level, determining a local binary pattern label for the image pixel based on binary values of neighboring image pixels of the image pixel in the first binary image or the subsequent second binary image.

4. The method of claim 3, further comprising:
adding the local binary pattern label for the image pixel to a local binary pattern histogram.

5. The method of claim 1, wherein the variable reference signal is an output of a single-slope ramp signal generator.

6. The method of claim 5, wherein the variable reference signal has a rising slope or a falling slope.

7. The method of claim 1,
wherein the plurality of sensor pixels form a two-dimensional array; and
wherein the address of each sensor pixel includes a column address and a row address.

8. The method of claim 1, wherein creating the binary image based on the address of each sensor pixel that generates the event includes:
assigning a "1" to each image pixel corresponding to each sensor pixel that generates the event, and assigning a "0" to each image pixel corresponding to each sensor pixel that does not generate the event; or
assigning a "1" to each image pixel corresponding to each sensor pixel that generates the event at a rate equal to or greater than a threshold rate, and assigning a "0" to each image pixel corresponding to each sensor pixel that generates the event at a rate less than the threshold rate.

9. The method of claim 1, wherein the event is a pulse.

10. An image sensor comprising:
a sensor pixel array including a plurality of sensor pixels, wherein each sensor pixel in the sensor pixel array includes a sensing element and a comparator, a signal input of the comparator coupled to the sensing element;
a global reference signal input port coupled to a reference input of the comparator of each sensor pixel, wherein the global reference signal input port is configured to receive a global reference signal varying monotonically among a plurality of reference levels, and wherein a same reference level is received at the reference inputs of the comparators of the plurality of sensor pixels at a given time;
an address encoder coupled to an output of the comparator of each sensor pixel in the sensor pixel array, the address encoder configured to encode an address of each sensor pixel that generates an event at the output of the comparator; and
a binary image generator configured to create a binary image at each reference level of the plurality of reference levels based on the address of each sensor pixel that generates the event at the each reference level.

11. The image sensor of claim 10, further comprising:
a local binary pattern generator configured to determine local binary pattern labels for image pixels whose binary value changes from a first binary image at a first reference level to a subsequent second binary image at a next reference level.

12. The image sensor of claim 11, wherein the local binary pattern generator is further configured to add the local binary pattern labels to a local binary pattern histogram.

13. The image sensor of claim 10, further comprising:
a single-slope ramp signal generator coupled to the global reference signal input port.

14. The image sensor of claim 13, wherein the single-slope ramp signal generator is configured to generate a rising slope or a falling slope.

15. The image sensor of claim 10,
wherein the sensor pixel array is a two-dimensional pixel array; and
wherein the address encoder includes:
a column address encoder configured to encode a column address of each sensor pixel that generates the event at the output of the comparator; and
a row address encoder configured to encode a row address of each sensor pixel that generates the event at the output of the comparator.

16. The image sensor of claim 10, wherein the binary image generator is configured to create the binary image based on the address of each sensor pixel that generates the event at each reference level by:
assigning a "1" to each image pixel corresponding to each sensor pixel that generates the event, and assigning a "0" to each image pixel corresponding to each sensor pixel that does not generate the event; or
assigning a "1" to each image pixel corresponding to each sensor pixel that generates the event at a rate equal to or greater than a threshold rate, and assigning a "0" to each image pixel corresponding to each sensor pixel that generates the event at a rate less than the threshold rate.

17. The image sensor of claim 10, wherein the event is a pulse.

18. The image sensor of claim 10, wherein the plurality of sensor pixels are complementary metal-oxide-semiconductor (CMOS) image sensors.

19. The image sensor of claim 10, wherein each sensor pixel in the sensor pixel array further includes a correlated double sampling (CDS) circuit configured to reduce noise.

20. An apparatus for local binary pattern generation, comprising:
means for receiving a variable reference signal at a plurality of sensor pixels, wherein the variable reference signal changes monotonically within a plurality of reference levels, and wherein a same reference level is received at the plurality of sensor pixels at a given time;
means for converting an optical signal on each sensor pixel of the plurality of sensor pixels into an electrical signal;

means for generating an event at each sensor pixel on which a condition based on a comparison between the electrical signal and a reference level of the plurality of reference levels is met;

means for encoding an address of each sensor pixel that generates the event; and means for creating a binary image for each reference level of the plurality of reference levels based on the address of each sensor pixel that generates the event at the each reference level.

21. The apparatus of claim 20, wherein the condition is met when the electrical signal is one of greater than, no less than, less than, or no greater than the reference level.

22. The apparatus of claim 20, further comprising:
means for, when a binary value of an image pixel changes from a first binary image for a first reference level to a subsequent second binary image for a next reference level, determining a local binary pattern label for the image pixel based on binary values of neighboring image pixels of the image pixel in the first binary image or the subsequent second binary image.

23. The apparatus of claim 22, further comprising:
means for adding the local binary pattern label for the image pixel to a local binary pattern histogram.

24. The apparatus of claim 20, wherein the variable reference signal is an output of a single-slope ramp signal generator.

25. The apparatus of claim 24, wherein the variable reference signal has a rising slope or a falling slope.

26. The apparatus of claim 20,
wherein the plurality of sensor pixels form a two-dimensional array; and
wherein the address of each sensor pixel includes a column address and a row address.

27. The apparatus of claim 20, wherein the means for creating the binary image based on the address of each sensor pixel that generates the event includes:
means for assigning a "1" to each image pixel corresponding to each sensor pixel that generates the event, and assigning a "0" to each image pixel corresponding to each sensor pixel that does not generate the event; or
means for assigning a "1" to each image pixel corresponding to each sensor pixel that generates the event at a rate equal to or greater than a threshold rate, and assigning a "0" to each image pixel corresponding to each sensor pixel that generates the event at a rate less than the threshold rate.

28. An article comprising a non-transitory storage medium including machine-readable instructions stored thereon that are executable by a special purpose computing device to:
receive a variable reference signal at a plurality of sensor pixels, wherein the variable reference signal changes monotonically within a plurality of reference levels, and wherein a same reference level is received at the plurality of sensor pixels at a given time; and
for each reference level of the plurality of reference levels:
convert, by each sensor pixel of the plurality of sensor pixels, an optical signal on each sensor pixel of the plurality of sensor pixels into an electrical signal;
generate an event at each sensor pixel on which a condition based on a comparison between the electrical signal and the reference level is met;
encode an address of each sensor pixel that generates the event; and
create a binary image based on the address of each sensor pixel that generates the event.

29. The article of claim 28, wherein the non-transitory storage medium further includes machine-readable instructions stored thereon that are executable by the special purpose computing device to:
when a binary value of an image pixel changes from a first binary image corresponding to a first reference level to a subsequent second binary image corresponding to a next reference level, determine a local binary pattern label for the image pixel based on binary values of neighboring image pixels of the image pixel in the first binary image or the subsequent second binary image.

30. The article of claim 29, wherein the non-transitory storage medium further includes machine-readable instructions stored thereon that are executable by the special purpose computing device to:
add the local binary pattern label for the image pixel to a local binary pattern histogram; and
extract features from the local binary pattern histogram for feature detection.

* * * * *